(12) United States Patent
Tabata et al.

(10) Patent No.: US 8,246,512 B2
(45) Date of Patent: Aug. 21, 2012

(54) CONTROL DEVICE FOR VEHICULAR POWER TRANSMITTING DEVICE

(75) Inventors: Atsushi Tabata, Okazaki (JP); Tooru Matsubara, Toyota (JP); Hiroyuki Shibata, Toyota (JP); Kenta Kumazaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1115 days.

(21) Appl. No.: 12/155,303

(22) Filed: Jun. 2, 2008

(65) Prior Publication Data

US 2009/0062070 A1    Mar. 5, 2009

(30) Foreign Application Priority Data

Jun. 7, 2007 (JP) ................ 2007-151498

(51) Int. Cl.
*F16H 59/60* (2006.01)
*F16H 59/62* (2006.01)

(52) U.S. Cl. .................. 477/97; 477/115
(58) Field of Classification Search .......... 477/97, 477/107, 115
See application file for complete search history.

(56) References Cited

U.S. PATENT DOCUMENTS

| | | | |
|---|---|---|---|
| 4,677,878 A * | 7/1987 | Yamamori et al. | 477/48 |
| 4,843,916 A * | 7/1989 | Bouta | 477/97 |
| 5,050,082 A * | 9/1991 | Kato | 701/99 |
| 5,088,350 A | 2/1992 | Kurihara et al. | |
| 6,087,734 A * | 7/2000 | Maeda et al. | 290/40 C |
| 6,522,024 B1 | 2/2003 | Takaoka et al. | |
| 7,396,316 B2 * | 7/2008 | Tabata et al. | 477/107 |
| 7,618,343 B2 | 11/2009 | Tabata et al. | |
| 7,641,587 B2 * | 1/2010 | Jess et al. | 477/97 |
| 2007/0111854 A1 | 5/2007 | Tabata et al. | |

FOREIGN PATENT DOCUMENTS

| | | |
|---|---|---|
| DE | 91 17 184 U1 | 10/1996 |
| JP | A-05-180324 | 7/1993 |
| JP | Y2 6-14109 | 4/1994 |
| JP | A 2005-264762 | 9/2005 |
| JP | A-2005-343458 | 12/2005 |
| JP | A-2006-329373 | 12/2006 |

OTHER PUBLICATIONS

Office Action dated Jan. 10, 2012 issued in Japanese Patent Application No. 2007-151498 (with translation).

* cited by examiner

*Primary Examiner* — Justin Holmes
(74) *Attorney, Agent, or Firm* — Oliff & Berridge, PLC

(57) ABSTRACT

In a control device for a vehicular power transmitting device, if engine torque $T_E$ generated with using a fuel other than a basic fuel by an internal combustion engine (8) connected to a shifting mechanism (10) for power transmitting capability, exceeds torque $T_{ES}$ generated with using a basic fuel, a downshift is initiated at a lower accel-opening than that at which the downshift is initiated with using the basic fuel. That is, the shifting is performed at a shift point enabling the suppression of a torque increase in consideration of an increase in engine torque $T_E$ generated by the internal combustion engine, thereby preventing rotary elements of the shifting mechanism (10) from reaching high-speed rotations during a transition in downshift. This minimizes a drop in durability of the shifting mechanism (10).

15 Claims, 9 Drawing Sheets

| | C1 | C2 | B1 | B2 | B3 | SPEED RATIO | STEPPING RATIO |
|---|---|---|---|---|---|---|---|
| 1st | ○ | | | | ○ | 3.357 | 1.54 |
| 2nd | ○ | | | ○ | | 2.180 | 1.53 |
| 3rd | ○ | | ○ | | | 1.424 | 1.42 |
| 4th | ○ | ○ | | | | 1.000 | SPREAD 3.36 |
| R | | ○ | | | ○ | 3.209 | |
| N | | | | | | | |

○ ENGAGED

CONTROL DEVICE FOR VEHICULAR POWER TRANSMITTING DEVICE

BACKGROUND OF THE INVENTION

1. Field of the Invention

This invention relates to a control device for a vehicular power transmitting device. More particularly, it relates to a technology of preventing rotary elements of the vehicular power transmitting device from reaching high-speed rotations during a transition in shifting due to an increased variation in torque generated by an internal combustion engine.

2. Description of the Related Art

In general, a vehicular power transmitting device has been disposed between an internal combustion engine and drive wheels for increasing a torque generated by the internal combustion engine, for transmitting the increased torque to the drive wheels. The vehicular power transmitting device was arranged to perform a shifting based on a shifting diagram formed on a two-dimensional coordinate with parameters related to a vehicle condition such as, for instance, an accelerator-opening, representing a depressing stroke of an accelerator pedal, and a vehicle speed. For instance, Patent Publication 1 (Japanese Patent Application Publication 2005-264762) discloses a control device for a hybrid type power transmitting device, in which a shifting was similarly and properly effectuated based on a shifting diagram that was preliminarily stored.

With the power transmitting devices including the device disclosed in Patent Publication 1, the internal combustion engine was supplied with fuel specified for each engine. Therefore, the internal combustion engine has the generated torque in a minimal variation. Thus, the vehicular power transmitting device has performed a shifting control without encountering an adverse affect caused by the variation in such torque, causing no probability of adversely affecting strength of the vehicular power transmitting device. In recent years, there has been probability of using mixed fuel, containing ethanol, in the internal combustion engine. Thus, the torque generated by the engine upon using mixed fuel had a further increased variation than that of toque generated upon using conventional fuel such as gasoline.

If the internal combustion engine generated increased torque with the use of for instance mixed fuel, rotary elements of the power transmitting device reached high-speed rotating states. This occurred during a transition in the shifting effectuated in the power transmitting device based on the conventional shifting diagram. Thus, there is a probability that durability of the rotary elements may drop. Such an issue occurred not only in the hybrid type power transmitting device disclosed in Patent Publication 1 but also in a power transmitting device, composed of for instance a torque converter and an automatic transmission, which was well known conventionally.

SUMMARY OF THE INVENTION

The present invention has been completed with the above view in mind, and has an object to provide a control device for a vehicular power transmitting device which can prevent rotary elements of the vehicular power transmitting device from reaching high-speed rotations, during a transition in shifting due to an increased variation in the torque generated by an internal combustion engine.

For achieving the above object, a first aspect of the invention relates to a control device for a vehicular power transmitting device for automatically performing a gear shifting depending on a driving condition of a vehicle, and is featured by that (a) an internal combustion engine generating a torque is connected to the vehicular power transmitting device in a power transmissive state; and (b) the control device includes downshift point altering means operative, when the torque generated by the internal combustion engine with using a fuel other than a predetermined fuel becomes greater than a torque generated with using the predetermined fuel, to initiate a downshift at a lower accelerator-opening than that at which the downshift is initiated with using the predetermined fuel.

A second aspect of the invention is featured by upshift point altering means operative, when the torque generated by the internal combustion engine with using a fuel other than a predetermined fuel is greater than the torque generated by the predetermined fuel, to initiate an upshift at a lower vehicle speed than that at which the upshift is initiated with using the predetermined fuel.

A third aspect of the invention is featured by the downshift point altering means operative, under presence of a big difference between the torque with using the fuel other than the predetermined fuel and the torque with using the predetermined fuel, to initiate the downshift at the lower accelerator-opening than that at which the downshift is initiated under presence of a little difference between the both torques.

A fourth aspect of the invention is featured by the downshift point altering means operative, when the torque generated by the internal combustion engine with using the fuel other than the predetermined fuel becomes less than the torque generated with using the predetermined fuel, under presence of a big difference between the both torques, to initiate the downshift at the higher accelerator-opening than that at which the downshift is initiated under presence of a little difference between the both torques.

A fifth aspect of the invention is featured by the vehicular power transmitting device includes an electrically controlled differential portion, operative to control a differential state between a rotation speed of an input shaft and a rotation speed of an output shaft upon controlling an operating state of an electric motor connected to a rotary element of a differential mechanism, and a step-variable transmission, operative to function as a step-variable shifting portion, both the electrically controlled differential portion and the a step-variable transmission portion being disposed in a power transmitting path.

For achieving the above object, a sixth aspect of the invention relates a control device for a vehicular power transmitting device, and is featured by that (a) an internal combustion engine generating a torque is connected to the vehicular power transmitting device in a power transmissive state, (b) the vehicular power transmitting device includes (i) an electrically controlled differential portion operative to control a differential state between a rotation speed of an input shaft and a rotation speed of an output shaft upon controlling an operating state of an electric motor connected to a rotary element of a differential mechanism, and (ii) a step-variable transmission portion operative to function as a step-variable shifting portion, the electrically controlled differential portion and the a step-variable transmission being disposed in a power transmitting path; and (c) the control device includes upshift point altering means operative, when the torque generated by the internal combustion engine with using a fuel other than a predetermined fuel becomes greater than the torque generated with using the predetermined fuel, to initiate an upshift at a lower vehicle speed than that at which the upshift is initiated with using the predetermined fuel.

A seventh aspect of the invention is featured by the control device further includes downshift point altering means operative, when the torque generated by the internal combustion engine with using a fuel other than a predetermined fuel becomes greater than the torque generated with using the predetermined fuel, under presence of a big difference between the both torques, to initiate the downshift at the lower vehicle speed than that at which the downshift is initiated under presence of a little difference between the both torques.

A eighth aspect of the invention is featured by the downshift point altering means operative, when the torque generated by the internal combustion engine with using a fuel other than a predetermined fuel becomes less than the torque generated with using the predetermined fuel, under presence of a big difference between the both torques, to initiate the downshift at a higher vehicle speed than that at which the downshift is initiated under presence of a little difference between the both torques.

A ninth aspect of the invention is featured by the torque generated by the internal combustion engine is detected based on the reactive torque of the electric motor.

A ninth aspect of the invention is featured by the torque generated by the internal combustion engine is detected upon increase of the fuel supplied to the internal combustion engine or opening of a fuel lid.

With the control device for the vehicular power transmitting device in the first aspect of the invention, when the torque generated by the internal combustion engine connected to the vehicular power transmitting device with using the fuel other than the predetermined fuel for example mixed fuel, becomes greater than the torque generated with using the predetermined fuel i.e. gasoline and light oil, the downshift is initiated by the downshift point altering means at the lower accelerator-opening than that at which the downshift is initiated with using the predetermined fuel.

This allows the shifting to be performed at the shift point enabling a decrease in the torque generated by the internal combustion engine. That is, the shifting is initiated at the shift point suppressing the increase in the torque in consideration of an increase in the torque generated by the internal combustion engine. Thus, the rotary elements of the vehicular power transmitting device can be prevented from reaching the high-speed rotations during the transition in downshift. That is, the high-speed rotations of the rotary elements of the vehicular power transmitting device can be prevented. This can suppress a drop i.e. deterioration in durability of the vehicular power transmitting device.

With the control device for the vehicular power transmitting device in the second aspect of the invention, there is provided the upshift point altering means. When the torque generated by the internal combustion engine using a fuel other than a predetermined fuel becomes greater than that generated with using the predetermined fuel, the upshift is initiated by the upshift point altering means at the lower vehicle speed than that at which the upshift is initiated with using the predetermined fuel. This allows the upshift to be initiated on an earlier stage. Thus, the rotation speeds of the internal combustion engine and the power transmitting device can be suppressed to lower levels, respectively, during the transition in upshift. Therefore, even if the torque increases in the internal combustion engine and a blowup of the internal combustion engine increases during the transition in upshift, the rotary elements of the power transmitting device can be prevented from reaching high-speed rotating regions. This can suppress a drop in durability of the vehicular power transmitting device.

With the control device for the vehicular power transmitting device in the third aspect of the invention, under presence of a big difference between the torque with using the fuel other than the predetermined fuel and the torque with using the predetermined fuel, the downshift is initiated by the downshift point altering means at the lower accelerator-opening than that at which the downshift is initiated under presence of a little difference between the both torques.

This allows the shifting to be performed at the shift point in which the internal combustion engine generates the decreased torque. That is, the shifting is initiated at the shift point avoiding a torque increase in view of a torque increase generated by the internal combustion engine. Thus, the rotary elements of the vehicular power transmitting device can be prevented from reaching the high-speed rotations during the transition in downshift. This can suppress a drop in durability of the vehicular power transmitting device.

With the control device for the vehicular power transmitting device in the fourth aspect of the invention, there is provided the downshift point altering means. When the torque generated by the internal combustion engine using a fuel other than a predetermined fuel becomes less than the torque generated with using the predetermined fuel, under presence of a big difference between the both torques, the downshift is initiated by the downshift point altering means at the higher accelerator-opening than that at which the downshift is initiated under presence of a little difference between the both torques.

Thus, even if the internal combustion engine generates the decreased torque, the shift point can be pulled up to a shift point involved in the high accelerator-opening region. This allows the shifting to be performed at the shift point enabling the internal combustion engine to generate the torque equal to that generated with using the predetermined fuel.

With the control device for the vehicular power transmitting device in the fifth aspect of the invention, the vehicular power transmitting device includes the electrically controlled differential portion and the shifting portion. This allows the shifting to be initiated at the shift point that can suppress a torque increase of the internal combustion engine. This prevents the rotary elements of the shifting portion and the electrically controlled differential portion from reaching the high-speed rotations, thereby avoiding a drop in durability of these component parts.

With the control device for the vehicular power transmitting device in the sixth aspect of the invention, when the torque generated by the internal combustion engine using a fuel other than a predetermined fuel becomes greater than the torque generated with using the predetermined fuel, the upshift is initiated by the upshift point altering means at the lower vehicle speed than that at which the upshift is initiated with using the predetermined fuel.

This allows the upshift to be executed on an earlier stage. Thus, the rotation speeds of the internal combustion engine and the shifting portion can be suppressed to lower levels during the transition in upshift. Therefore, even if the torque increases in the internal combustion engine and a blowup of the internal combustion engine increases during the transition in upshift, the electrically controlled differential portion and the shifting portion can be prevented from reaching the high-speed rotating regions. This can suppress a drop in durability of the vehicular power transmitting device.

With the control device for the vehicular power transmitting device in the seventh aspect of the invention, the downshift point altering means is provided to perform the operation described below. That is, when the torque generated by the internal combustion engine using a fuel other than a predetermined fuel becomes greater than the torque generated with using the predetermined fuel, under presence of a big difference between the both torques, the downshift is initiated by the downshift point altering means at the lower vehicle speed than that at which the downshift is initiated under presence of a little difference between the both torques.

Thus, the rotation speeds of the internal combustion engine and the power transmitting device can be suppressed to lower levels, respectively, during the transition in downshift. Therefore, even if the torque increases in the internal combustion engine and a blowup of the internal combustion engine increases during the transition in downshift, the rotary elements of the power transmitting device can be prevented from reaching the high-speed rotating regions. This suppresses a drop in durability of the vehicular power transmitting device.

With the control device for the vehicular power transmitting device in the eighth aspect of the invention, the downshift point altering means is operative, when the torque generated by the internal combustion engine with using a fuel other than a predetermined fuel becomes less than the torque generated with using the predetermined fuel, under presence of a big difference between the both torques, to initiate the downshift at a higher vehicle speed than that at which the downshift is initiated under presence of a little difference between the both torques.

If the torque generated at the internal-combustion-engine decreases during the transition in downshift, the shifting point can be altered to the high vehicle speed side. Thus, decrease of the rotation speed of both the internal-combustion-engine and the power transmitting member resulted from the decreased torque, that is, the decrease of the power ability can be suppressed.

With the control device for the vehicular power transmitting device in the ninth aspect of the invention, the torque generated by the internal combustion engine is detected based on the reactive torque of the electric motor. Thus, the torque of the internal-combustion-engine can be detected without adding parts such as the torque sensor and the like.

With the control device for the vehicular power transmitting device in the tenth aspect of the invention, the torque generated by the internal combustion engine is detected upon increase of the fuel supplied to the internal combustion engine or opening of a fuel lid. In other words, the torque detection is not executed constantly. Thus, constant execution of the downshift point altering means and the upshift point altering means can be avoided, which can reduce the load necessary for control.

Preferably, the planetary gear set includes a single pinion type planetary gear set. With such a structure, the differential mechanism has a minimized axial direction. In addition, the differential mechanism can be simply structured with the single pinion type planetary gear set.

More preferably, the vehicular drive system establishes a total shifting ratio i.e. speed ratio based on the speed ratio or shifting ratio (gear ratio) of the transmission portion and the shifting ratio of the differential portion. With such a structure, utilizing the shifting ratio of the transmission portion enables a vehicle drive force to be obtained in a wide range.

More preferably, the transmission portion includes an automatic transmission. With such a structure, the continuously variable transmission is comprised of, for instance, the differential portion rendered operative as an electrically controlled continuously variable transmission, and a step-variable transmission, varying the drive torque smoothly. When the differential portion is controlled to keep the shifting ratio at a nearly fixed level, the differential portion and the step-variable transmission provide a status as that equivalent to the step-variable transmission. This can cause the vehicular drive system to vary the total shifting ratio step-by-step for thereby obtaining immediate drive torque.

More preferably, the shifting portion is automatically shifted based on a shifting diagram set in advance. Thus, the shifting portion can be shifted to a preferable shifting position depending on a vehicle condition. Based on the shifting ratio at the electrically operated differential portion and that at the shifting portion, the shifting ratio of wide range can be obtained.

DETAILED DESCRIPTION OF THE PREFERRED EMBODIMENS

In the following, embodiments of the present invention will be explained with reference to attached drawings.
<Embodiment>

Figures 1, 2:
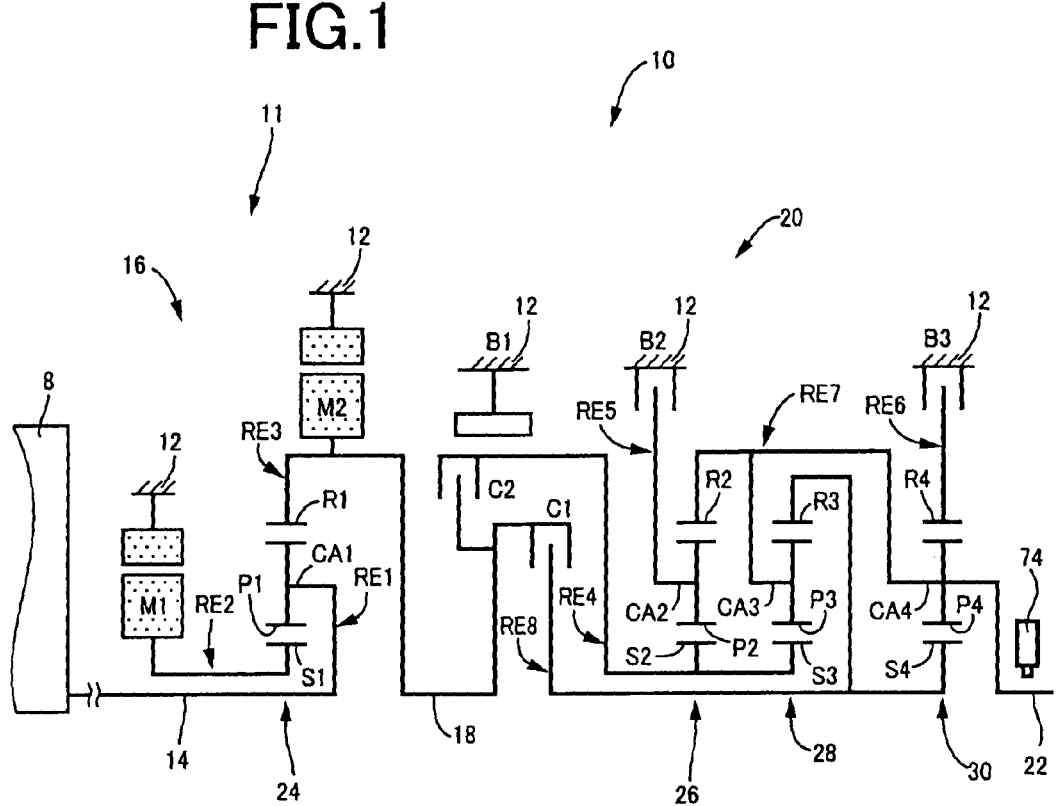
FIG. 1 is a skeleton diagram showing structure of a vehicular drive system of one embodiment according to the present invention for use in a hybrid vehicle.
FIG. 2 is a functional diagram illustrating combined operations of hydraulically operated frictional engaging devices for use in the vehicular drive system shown in FIG. 1.

FIG. 1 is a skeleton diagram for illustrating a transmission mechanism i.e., shifting mechanism 10 constituting a part of a drive system for a hybrid vehicle to which the present invention is applied. As shown in FIG. 1, the transmission mechanism 10 includes a transmission case 12 (hereinafter referred to as "a case 12") mounted on a vehicle body as a non-rotary member, an input shaft 14 disposed inside the case 12 as an input rotary member, a differential portion 11, an automatic transmission portion i.e. automatic shifting portion 20, and an output shaft 22 connected to the automatic transmission portion 20 and serving as an output rotary member.

Here, the differential portion 11 is coaxially connected to the input shaft 14 either directly or indirectly via a pulsation absorbing damper (vibration damping device), not shown, and serving as a continuously variable transmission portion. The automatic transmission portion 20 is connected in series in a power transmitting path between the differential portion 11 and drive wheels 34 (see FIG. 7) through a power transmitting member 18 (power transmitting shaft).

The transmission mechanism 10 is suitably applied to an FR (front-engine and reverse-drive) type vehicle and mounted on a vehicle along a fore and aft direction thereof. The transmission mechanism 10 is disposed between an engine 8 and a pair of drive wheels 34. The engine 8 includes an internal combustion engine such as a gasoline engine or a diesel engine or the like and serves as a drive-power source. The engine 8 is directly connected to the input shaft 12 in series or indirectly through the pulsation absorbing damper (vibration damping device), not shown. This allows a vehicle drive force to be transferred from the engine 8 to the pair of drive wheels 34 in sequence through a differential gear device 32 (final speed reduction gear) (see FIG. 7) and a pair of drive axles.

With the transmission mechanism 10 of the illustrated embodiment, the engine 8 and the differential portion 11 are directly connected to each other. As used herein, the term "directly connected to each other" refers to a structure under which a direct connection is established between the associated component parts in the absence of a fluid-operated power transmitting device, such as a torque converter or a fluid engaging device or the like, and a connection including, for instance, the pulsation absorbing damper is involved in such a direction connection. It is noted that a lower half of the transmission mechanism 10, which is constructed symmetrically with respect to its axis, is omitted in FIG. 1. This is also true for the other embodiments of the invention described below.

The differential portion 11 includes a first electric motor M1, a power distributing mechanism 16, and a second electric motor M2 operatively connected to the power transmitting member 18 to be unitarily rotate therewith. Here, the power distributing mechanism 16 is structured in a mechanism for mechanically distributing an output of the engine 8 applied to the input shaft 14, which functions as a differential mechanism through which the engine output is distributed to the first electric motor M1 and the power transmitting member 18. In the illustrated embodiment, both the first and second electric motors M1 and M2 are so-called motor/generators each having a function to generate electric power. The first electric motor M1 has at least a function as an electric power generator for generating a reaction force. The second electric motor M2 has at least a function as a motor (electric motor) serving as a running drive power source to output a vehicle drive force.

The power distributing mechanism 16 includes, as a major component, a first planetary gear set 24 of a single pinion type having a gear ratio $\rho 1$ of about 0.418, for example. The first planetary gear set 24 has rotary elements (elements) composed of a first sun gear S1, a first planetary gear P1, a first carrier CA1 supporting the first planetary gear P1 such that the first planetary gear P1 is rotatable about its axis and about the axis of the first sun gear S1, and a first ring gear R1 meshing with the first sun gear S1 through the first planetary gear P1. Where the numbers of teeth of the first sun gear S1 and the first ring gear R1 are represented by ZS1 and ZR1, respectively, the above gear ratio $\rho 1$ is represented by ZS1/ZR1. The power distributing mechanism 16 in the embodiment corresponds to the claimed differential mechanism.

With the power distributing mechanism 16, a first carrier CA1 is connected to the input shaft 14, i.e., the engine 8; a first sun gear S1 is connected to the first electric motor M1; and a first ring gear R1 is connected to the power transmitting member 18. With the power distributing mechanism 16 of such a structure, the three elements of the first planetary gear set 24, i.e., the first sun gear S1, the first planetary gear P1, the first carrier CA1 and the first ring gear R1 are arranged to rotate relative to each other for initiating a differential action, i.e., in a differential state under which the differential action is initiated. This allows the engine output to be distributed to the first electric motor M1 and the power transmitting mechanism 18. Then, a part of the distributed engine output drives the first electric motor M1 to generate electric energy, which is stored and used for rotatably driving the second electric motor M2.

Thus, the differential portion 11 (power distributing mechanism 16) is caused to function as an electric differential device such that, for instance, the differential portion 11 is placed in a so-called continuously variable shifting state (electrically established CVT state) to continuously vary the rotation of the power transmitting member 18 regardless of the engine 8 operating at a given rotational speed.

That is, the differential portion 11 functions as an electrically controlled continuously variable transmission to provide a shifting ratio i.e. speed ratio $\gamma 0$ (rotational speed $N_{IN}$ of the input shaft 14/rotational speed $N_{18}$ of the power transmitting member 18) that is continuously variable from a minimum value $\gamma 0\min$ to a maximum value $\gamma 0\max$. In this way, the first electric motor M1, the second electric motor M2 and the engine 8 all connected to the differential portion 11 (power distributing mechanism 16) in the power transmissive state are controlled in the operating conditions thereof. Thus, the differential portion 11 is caused to operate as the continuously variable transmission in which the differential state of the rotation speeds between the input shaft 14 and the transmitting member 18 functioning as the output shaft is controlled. Here, the transmitting member 18 in the embodiment corresponds to the claimed output shaft.

The automatic transmission portion 20 includes a single-pinion type second planetary gear set 26, a single-pinion type third planetary gear set 28 and a single-pinion type fourth planetary gear set 30. The automatic transmission portion 20 is a planetary gear type multiple-step transmission operable as a step-variable automatic transmission. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a given gear ratio $\rho 2$ of about "0.562".

The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a given gear ratio $\rho 3$ of about "0.425".

The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a given gear ratio ρ4 of, for instance, about "0.4211". The automatic shifting portion in the embodiment corresponds to the claimed step variable shifting portion.

With the second sun gear S2, second ring gear R2, third sun gear S3, third ring gear R3, fourth sun gear S4 and fourth ring gear R4 having the numbers of gear teeth represented by ZS2, ZR2, ZS3, ZR3, ZS4 and ZR4, respectively, the gear ratios ρ2, ρ3 and ρ4 are expressed by ZS2/ZR2, ZS3/ZR3, and ZS4/ZR4, respectively. The automatic transmission portion 20 in the embodiment corresponds to the claimed step variable shifting portion.

In the automatic transmission portion 20, the second and third sun gears S2, S3 are integrally connected to each other, selectively connected to the power transmitting member 18 through a second clutch C2, and selectively connected to the casing 12 through a first brake B1. The second carrier CA2 is selectively connected to the casing 12 through a second brake B2, and the fourth ring gear R4 is selectively connected to the casing 12 through a third brake B3. The second ring gear R2, third carrier CA3 and fourth carrier CA4 are integrally connected to each other and connected to the output shaft 22. The third ring gear R3 and the fourth sun gear S4 are integrally connected to each other and selectively connected to the power transmitting member 18 through a first clutch C1.

Thus, the automatic transmission portion 20 and the differential portion 11 (power transmitting member 18) are selectively connected to each other through the first clutch C1 or the second clutch C2, which is provided to establish each gear position (shift gear position) in the automatic transmission portion 20. In other words, the first and second clutches C1, C2 function as engaging devices i.e., coupling device operable to place the power transmitting path between the power transmitting member 18 and the automatic transmission portion 20, that is, the power transmitting path between the differential portion 11 (power transmitting member 18) and the drive wheels 34, selectively in one of a power transmitting state in which the vehicle drive force can be transmitted through the power transmitting path, and the power cut-off state in which the vehicle drive force cannot be transmitted through the power transmitting path. That is, with at least one of the first and second clutches C1 and C2 brought into coupling engagement, the power transmitting path is placed in the power transmitting state. In contrast, uncoupling i.e. disengaging both the first and second clutches C1 and C2 places the power transmitting path in the power cut-off state.

With the automatic transmission portion 20, further, uncoupling an on-uncoupling side engaging device while coupling an on-coupling side engaging device allows a so-called "clutch-to-clutch" shifting action to be executed for respective gear positions to be selectively established. This allows a speed ratio γ (=rotational speed $N_{18}$ of the power transmitting member 18/rotational speed $N_{OUT}$ of the output shaft 22) to be obtained in equally varying ratio for each gear position. As indicated in the coupling operation table shown in FIG. 2, coupling the first clutch C1 and third brake B3 establishes 1st-speed gear position having a speed ratio γ1 of approximately, for instance, "3.357".

With the first clutch C1 and second brake B3 coupled in operation, a 2nd-speed gear position is established with a speed ratio γ2 of, for instance, approximately "2.180", which is lower a value of the speed ratio γ1. With the first clutch C1 and first brake B1 coupled in operation, a 3rd-speed gear position is established with a speed ratio γ3 of, for instance, approximately "1.424", which is lower a value of the speed ratio γ2. Coupling the first clutch C1 and second clutch C2 establishes a 4th-speed gear position with a speed ratio γ4 of, for instance, approximately "1.000", which is lower than the speed ratio γ3. Coupling the second clutch C2 and third brake B3 establishes a reverse-drive gear position (reverse-drive shift position) with a speed ratio γR of, for instance, approximately 3.209, which is intermediate between those of the 1st-speed gear position and the 2nd-speed gear position. In addition, uncoupling i.e., disengaging or releasing the first clutch C1, second clutch C2, first brake B1, second brake B2 and third brake B3 allows a neutral position N to be established.

The first clutch C1, second clutch C2, first brake B1, second brake B2 and third brake B3 (hereinafter collectively referred to as the clutch C and brake B, unless otherwise specified) are hydraulically operated frictional engaging devices that are used in the conventional vehicular automatic transmission. Each of these frictional engaging devices may include a wet-type multiple-disc clutch, having a plurality of mutually overlapping friction plates adapted to be pressurized against each other by a hydraulic actuator, or a band brake including a rotary drum having an outer circumferential surface on which one band or two bands are wound with terminal ends being adapted to be tightened by a hydraulic actuator. Thus, the frictional engaging device serves to selectively provide a drive connection between two component parts between which each clutch or brake is interposed.

With the transmission mechanism 10 of such a structure, the differential portion 11, serving as the continuously variable transmission, and the automatic transmission portion i.e. shifting portion 20 constitute a continuously variable transmission. Further, with the differential portion 11 controlled so as to provide a speed ratio kept at a fixed level, the differential portion 11 and the automatic transmission portion 20 can provide the same state as that of a step-variable transmission.

More particularly, the differential portion 11 functions as the continuously variable transmission, and the automatic transmission portion 20 connected to the differential portion 11 in series functions as the step-variable transmission. Thus, the rotational speed, input to the automatic transmission portion 20 placed for at least one gear position M, (hereinafter referred to as "input rotational speed of the automatic transmission portion 20"), that is, the rotational speed of the power transmitting member 18 (hereinafter referred to as "transmitting-member rotational speed $N_{18}$") are caused to continuously vary, thereby enabling the gear position M to have a continuously variable speed range.

Accordingly, the transmission mechanism 10 provides an overall speed ratio γT (rotational speed $N_{IN}$ of the input shaft 14/rotational speed $N_{OUT}$ of the output shaft 22) in a continuously variable range. Thus, the continuously variable transmission is established in the transmission mechanism 10. The overall speed ratio γT of the transmission mechanism 10 is the total speed ratio γT of a whole of the automatic transmission portion 20 that is established based on the speed ratio γ0 of the differential portion 11 and the speed ratio γ of the automatic transmission portion 20.

For the respective gear positions such as, for instance, the 1st-speed to 4th-speed gear positions of the automatic transmission portion 20 and the reverse-drive gear position as indicated in the coupling operation table shown in FIG. 2, the transmitting-member rotational speed $N_{18}$ is continuously varied with each gear position being obtained in a continuously variable speed range. Accordingly, a continuously variable speed ratio is present between adjacent gear positions, enabling the whole of the transmission mechanism 10 to have the total speed ratio γT in a continuously variable range.

Further, the speed ratio γ0 of the differential portion 11 is controlled so as to lay at a fixed level and the clutch C and brake B are selectively coupled, thereby causing either one of the 1st-speed to 4th-speed gear positions or the reverse-drive gear position (reverse-drive shift position) to be selectively established. This allows the overall speed ratio γT, variable in a nearly equal ratio, of the transmission mechanism 10 to be obtained for each gear position. Thus, the transmission mechanism 10 can be established in the same state as that of the step-variable transmission.

If, for instance, the differential portion 11 is controlled so as to provide the speed ratio γ0 at a fixed value of "1", the transmission mechanism 10 provides the total speed ratio γT for each gear position of the 1st-speed to 4th-speed gear positions of the automatic transmission portion 20 and the reverse-drive gear position as indicated by the coupling operation table shown in FIG. 2. Further, if the automatic transmission portion 20 is controlled under the 4th-speed gear position so as to cause the differential portion 11 to have the speed ratio γ0 of approximately, for instance, "0.7" less than a value of "1", the automatic transmission portion 20 has the total speed ratio γT of approximately, for instance, "0.7" that is less than a value of the 4th-speed gear position.

Figure 3:
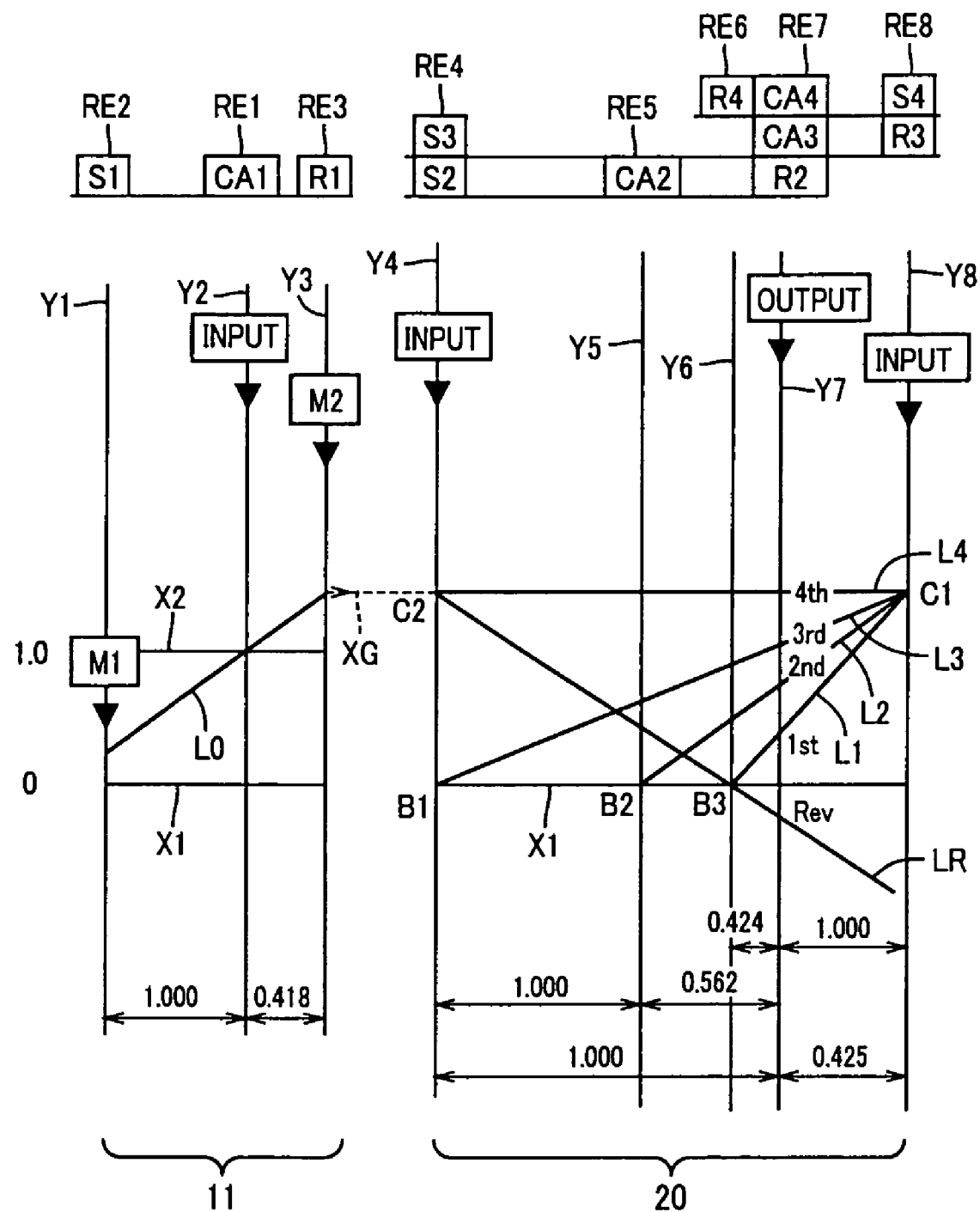
FIG. 3 is a collinear chart indicating mutually relative rotating speeds of rotary elements establishing various gear positions in the vehicular drive system shown in FIG. 1.

FIG. 3 is a collinear chart for the transmission mechanism 10, including the differential portion 11 and the automatic transmission portion 20, wherein the relative motion relationships among the rotational speeds of the various rotary elements in different coupling states for each gear position can be plotted on straight lines. The collinear chart of FIG. 3 takes the form of a two-dimensional coordinate system having the abscissa axis plotted with the gear ratios ρ of the planetary gear sets 24, 26, 28, 30 and the ordinate axis plotted with the mutually relative rotating speeds of the rotary elements. A transverse line X1 indicates the rotational speed that is zeroed; a transverse line X2 the rotational speed of "1.0", that is, the rotating speed $N_E$ of the engine 8 connected to the input shaft 14; and a transverse line XG the rotational speed of the power transmitting member 18.

Starting from the left, three vertical lines Y1, Y2 and Y3, associated with the three elements of the power distributing mechanism 16 forming the differential portion 11, represent the mutually relative rotating speeds of the first sun gear S1 corresponding to a second rotary element (second element) RE2, the first carrier CA1 corresponding to a first rotary element (first element) RE1, and the first ring gear R1 corresponding to a third rotary element (third element) RE3, respectively. A distance between the adjacent vertical lines is determined based on the gear ratio ρ1 of the first planetary gear set 24.

Starting from the left, further, five vertical lines Y4, Y5, Y6, Y7 and Y8 for the automatic transmission portion 20 represent the mutually relative rotating speeds of: the second and third sun gears S2, S3, connected to each other, which corresponds to a fourth rotary element (fourth element) RE4; the second carrier CA2 corresponding to a fifth rotary element (fifth element) RE5; the fourth ring gear R4a corresponding to a sixth rotary element (sixth element) RE6; the second ring gear R2, third carriers CA3 and fourth carriers CA4, connected to each other, which correspond to a seventh rotary element (seventh element) RE7; and the third ring gear R3 and fourth sun gear S4 connected to each other and corresponding to an eighth rotary element (eighth element) RE8, respectively. Each distance between the adjacent vertical lines is determined based on the gear ratios ρ2, ρ3 and ρ4 of the second, third and fourth planetary gear sets 26, 28, 30.

In the relationship among the vertical lines on the collinear chart, if a space between the sun gear and carrier is set to a distance corresponding to a value of "1", then, a space between the carrier and ring gear lies at a distance corresponding to the gear ratio ρ of the planetary gear set. That is, for the differential portion 11, a space between the vertical lines Y1 and Y2 is set to a distance corresponding to a value of "1" and a space between the vertical lines Y2 and Y3 is set to a distance corresponding to the gear ratio ρ1. For the automatic transmission portion 20, further, the space between the sun gear and carrier is set to the distance corresponding to the value of "1" for each of the second, third and fourth planetary gear sets 26, 28, 30, for which the space between the carrier and ring gear is set to the distance corresponding to the gear ratio ρ1.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is connected to the input shaft 14, i.e., the engine 8 and the second rotary element RE2 is connected to the first electric motor M1. The third rotary element RE3 (first ring gear R1) is connected to the power transmitting member 18 and the second electric motor M2. Thus, a rotary motion i.e. rotation of the input shaft 14 is transmitted (input) to the automatic transmission portion 20 through the power transmitting member 18. A relationship between the rotational speeds of the first sun gear S1 and the first ring gear R1 is represented by an inclined straight line L0 which passes across an intersection point between the lines Y2 and X2.

Now, description is made of a case in which, for example, the differential portion 11 is placed in a differential state with the first to third rotary elements RE1 to RE3 enabled to rotate relative to each other while the rotational speed of the first ring gear R1, indicated at an intersecting point between the straight line L0 and the vertical line Y1, is bound with the vehicle speed V and remains at a nearly constant level. In this case, as the engine speed $N_E$ is controlled with the rotational speed of the first carrier CA1, as represented by an intersecting point between the straight line L0 and the vertical line Y2, being raised or lowered, the rotational speed of the first sun gear S1, i.e., the rotational speed of the first electric motor M1, indicated by an intersecting pint between the straight line L0 and the vertical line Y1, is raised or lowered.

On controlling the rotational speed of the first electric motor M1 so as to allow the differential portion 11 to have the speed ratio γ0 of "1" with the first sun gear S1 rotating at the same speed as the engine speed $N_E$, the straight line L0 is aligned with the horizontal line X2. Then, the first ring gear R1, i.e., the power transmitting member 18 is caused to rotate at the same speed as the engine speed $N_E$. On the contrary, if the rotational speed of the first electric motor M1 is controlled so as to allow the differential portion 11 to have the speed ratio γ0 of a value less than "1", for instance, a value of approximately "0.7" with the rotational speed of the first sun gear S1 being zeroed, the power transmitting member 18 is caused to rotate at an increased transmitting-member rotational speed $N_{18}$ higher than the engine speed $N_E$.

With the automatic transmission portion 20, the fourth rotary element RE4 is selectively connected to the power transmitting member 18 via the second clutch C2 and selectively connected to the casing 12 via the first brake B1 with the fifth rotary element RE5 being selectively connected to the casing 12 via the second brake B2. The sixth rotary element RE6 is selectively connected to the casing 12 via the third brake B3 with the seventh rotary element RE7 connected to the output shaft 22, and the eighth rotary element RE8 is selectively connected to the power transmitting member 18 via the first clutch C1.

Next, description is made of a case wherein with the automatic transmission portion 20, the differential portion 11 is placed in a state with the straight line L0 brought into coincidence with the horizontal line X2 to cause the differential portion 11 to transfer the vehicle drive force to the eighth rotary element RE8 at the same speed as the engine speed $N_E$ upon which the first clutch C1 and the third brake B3 are coupled as shown in FIG. 3. In this case, the rotational speed of the output shaft 22 for the 1st-speed gear position is represented by an intersecting point between the inclined line L1, passing across an intersecting point between the vertical line Y8 indicative of the rotational speed of the eighth rotary element RE8, and the horizontal line X2 and a point of intersection between the vertical line Y6 indicative of the rotational speed of the sixth rotary element RE6, and the horizontal line X1, and an intersecting point intersecting the vertical line Y7 indicative of the rotational speed of the seventh rotary element RE connected to the output shaft 22 as indicated in FIG. 3.

Similarly, the rotational speed of the output shaft 22 for the 2nd-speed gear position is represented by an intersecting point between an inclined straight line L2 determined when the first clutch C1 and second brake B2 are coupled, and the vertical line Y7 indicative of the rotational speed of the seventh rotary element RE7 connected to the output shaft 22. The rotational speed of the output shaft 22 for the 3rd-speed gear position is represented by an intersecting point between an inclined straight line L3 determined with the first clutch C1 and first brake B1 being coupled, and the vertical line Y7 indicative of the rotational speed of the seventh rotary element RE7 connected to the output shaft 22. The rotational speed of the output shaft 22 for the 4th-speed gear position is represented by an intersecting point between a horizontal straight line L4 determined with the first clutch C1 and second brake B2 being coupled, and the vertical line Y7 indicative of the rotational speed of the seventh rotary element RE7 connected to the output shaft 22.

Figure 4:
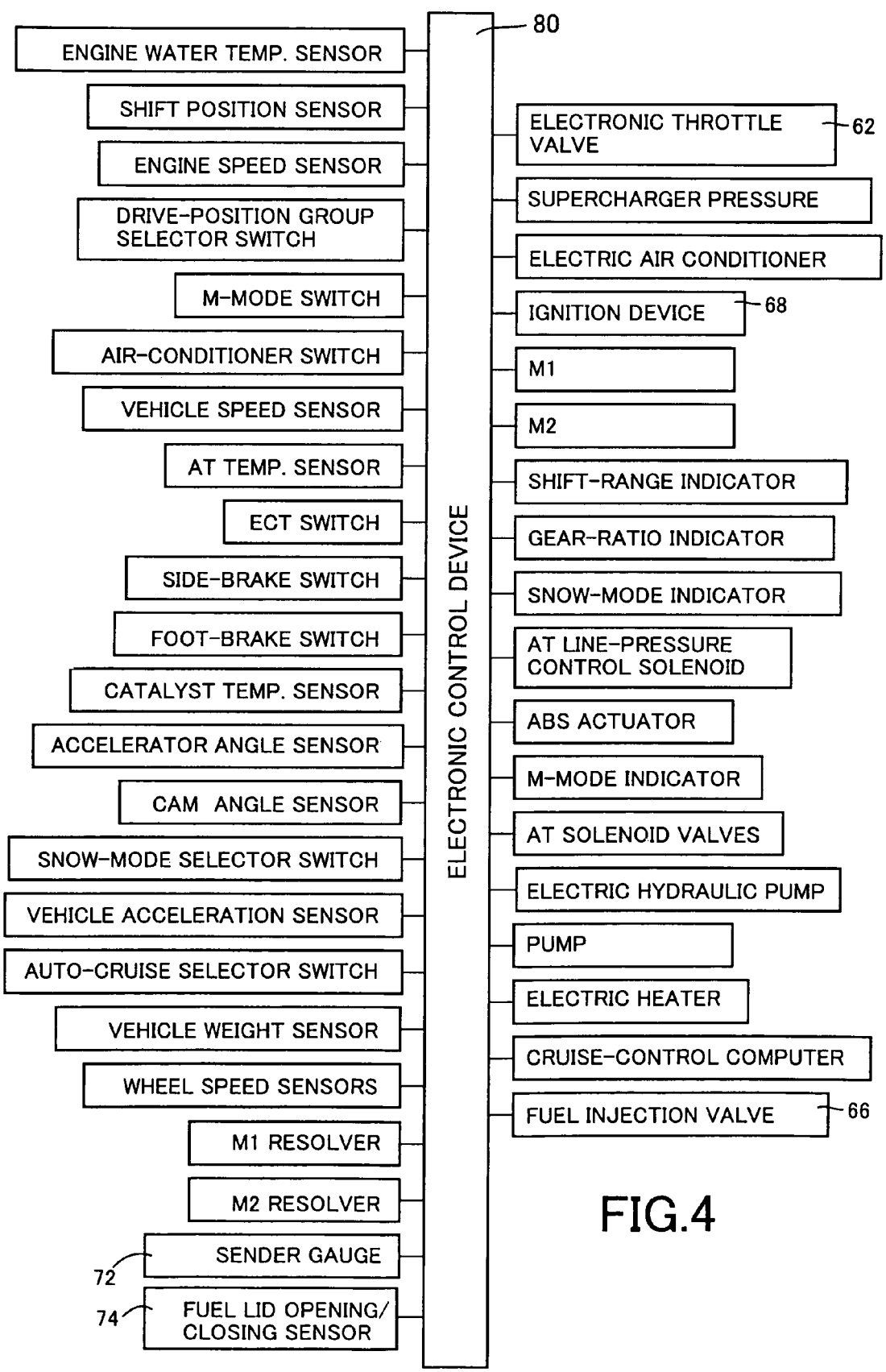
FIG. 4 is a view showing an electronic control unit with input and output signals associated therewith which is provided in the vehicular drive system shown in FIG. 1.

FIG. 4 shows an electronic control unit 80 operative to control the transmission mechanism 10 of the present invention for generating various output signals in response to various input signals. The electronic control unit 80 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and first and second electric motors M1 and M2, and drive controls such as shifting controls of the automatic transmission portion 20.

The electronic control unit 80, connected to various sensors and switches as shown in FIG. 4, receives various signals such as: a signal indicative of an engine coolant temperature $TEMP_W$; a signal indicative of a shift position $P_{SH}$ selected with a shift lever 52 (shown in FIG. 7) and a signal indicative of the number of operations initiated on the "M" position; a signal indicative of the engine speed $N_E$ representing the rotational speed of the engine 8; a signal indicative of a gear train preset value; a signal commanding an M mode (manual shift running mode); a signal indicative of an operated state of an air conditioner; a signal indicative of the rotational speed (hereinafter referred to as "output shaft speed") $N_{OUT}$ of the output shaft 22; a signal indicative of a temperature $T_{OIL}$ of working oil of the automatic transmission portion 20.

The electronic control unit 80 also receives a signal indicative of a side brake under operation; a signal indicative of a foot brake under operation; a signal indicative of a temperature of a catalyst; a signal indicative of an accelerator opening Acc representing an operating stroke of an accelerator pedal when manipulated by a driver for his output demand value; a signal indicative of a cam angle; a signal indicative of a snow mode under setting; a signal indicative of a fore and aft acceleration value G of the vehicle; a signal indicative of an auto-cruising drive mode; a signal indicative of a weight 'vehicle weight) of the vehicle; a signal indicative of a wheel velocity of each drive wheel; a signal indicative of a rotational speed $N_{M1}$ of the first electric motor M1 i.e. M1 resolver (hereinafter referred to as "first-electric motor speed $N_{M1}$); a signal indicative of a rotational speed $N_{M2}$ of the second electric motor M2 i.e. M2 resolver (hereinafter referred to as "second-electric motor speed $N_{M2}$); a signal indicative of a state of charge SOC stored in an electric-energy storage device 60 (see FIG. 7); a signal from a sender gauge 72 indicative of remained fuel amount in a fuel tank; and a signal from a fuel lid opening/closing sender 74 indicative an open/close operation of the fuel lid.

The electronic control unit 80 generates various signals including: a control signal applied to an engine output control device 58 (see FIG. 7) for controlling an engine output, i.e., a drive signal applied to a throttle actuator 64 for controlling a throttle valve opening $\theta_{TH}$ of an electronic throttle valve 62 disposed in an intake manifold 60 of the engine 8; a fuel supply quantity signal applied to a fuel injecting device 66 for controlling an amount of fuel injected into the intake manifold 60 or cylinders of the engine 8; an ignition signal applied to an ignition device 68 to control the ignition timing of the engine 8; a supercharger pressure regulation signal for regulating a supercharger pressure of the engine 8; an electric air-conditioner drive signal for actuating an electric air-conditioner; command signals for commanding the operations of the first and second electric motors M1 and M2; a shift-position (manipulated position) display signal for actuating a shift-range indicator; a gear-ratio indicating signal for displaying the gear ratio.

The electronic control unit 80 also generates snow-mode display signal for displaying the presence of a snow-mode; an ABS actuation signal for operating an ABS actuator to preclude slippages of the drive wheels during a braking phase; an M-mode display signal for displaying an M-mode being selected; valve command signals for actuating electromagnetic valves (linear solenoid valves), incorporated in the hydraulic control unit 70 (see FIGS. 5 and 7) for controlling the hydraulic actuators of the hydraulically operated frictional engaging devices of the differential portion 11 and automatic transmission portion 20; a signal for regulating a regulator valve (pressure regulator valve), incorporated in the hydraulic control unit 70, to regulate a line pressure PL; a drive command signal for actuating an electric hydraulic pump acting as a hydraulic original-pressure source for the, line pressure $P_L$ to be regulated; a signal for driving an electric heater; and a signal applied to a cruise-control computer.

Figure 5:
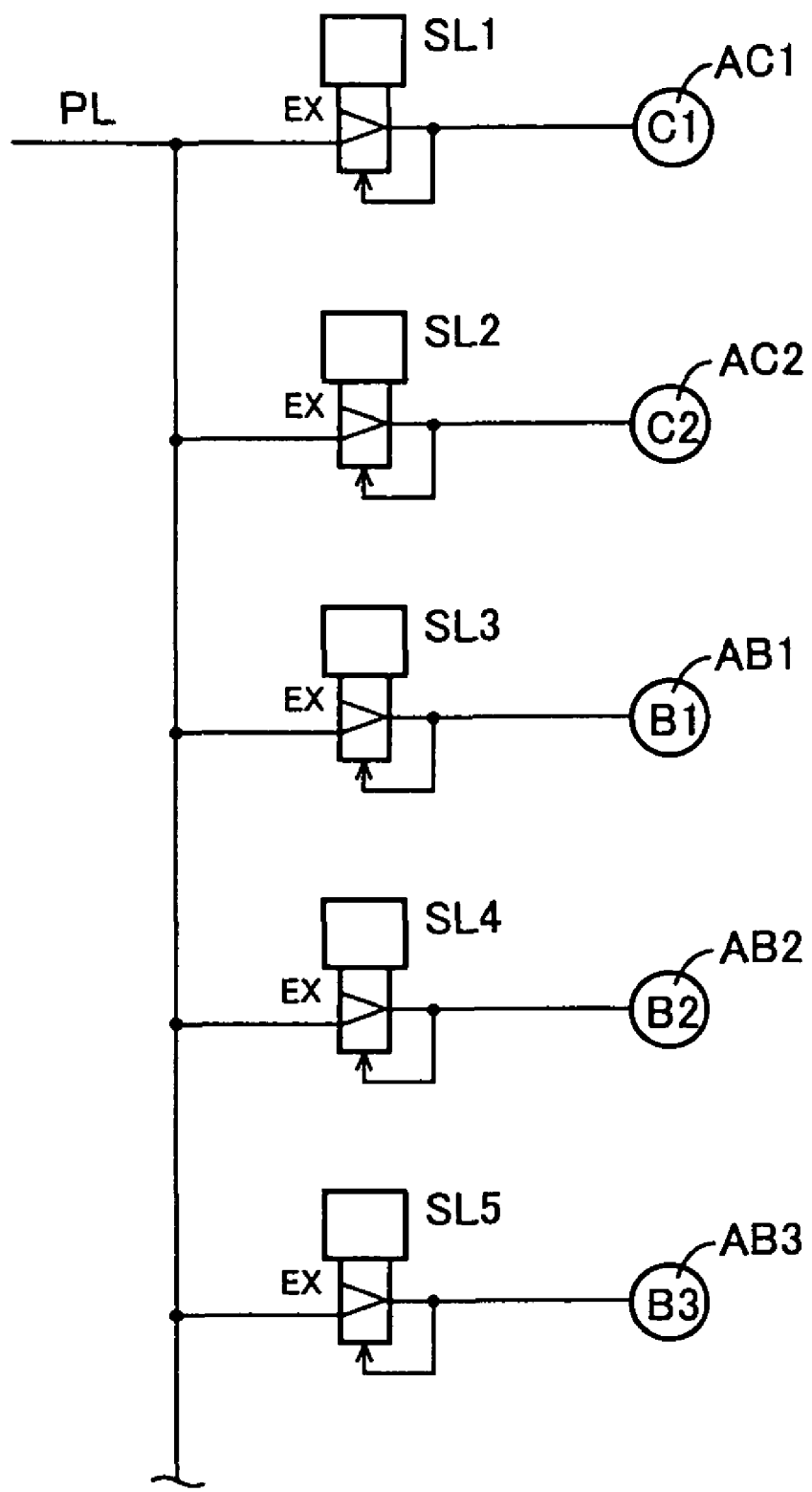
FIG. 5 is a circuit diagram showing a major portion of a hydraulic control circuit associated with linear solenoid valves arranged to control operations of respective hydraulic actuators of clutches C and brakes B.

FIG. 5 is a circuit diagram related to linear solenoid valves SL1 to SL5 of the hydraulic control circuit 70 for controlling the operations of respective hydraulic actuators (hydraulic cylinders) AC1, AC2, AB1, AB2, AB3 of the clutches C1, C2 and brakes B1 to B3.

As shown in FIG. 5, the hydraulic actuators AC1, AC2, AB1, AB2, AB3 are connected to the respective linear solenoid valves SL1-SL5, which are controlled in response to control commands, delivered from the electronic control unit 80. This adjusts the line pressure PL into respective clutch engaging pressures PC1, PC2, PB1, PB2 and PB3 to be applied directly to the respective hydraulic actuators AC1, AC2, AB1, AB2, AB3. The line pressure $P_L$ represents an original hydraulic pressure, generated by an electrically operated hydraulic oil pump (not shown) or a mechanical oil pump driven by the engine 30, which is regulated by a relief-type pressure regulator valve depending on a load of the engine 8 in terms of an accelerator opening displacement $A_{CC}$ or a throttle valve opening $\theta_{TH}$.

The linear solenoid valves SL1 to SL5, fundamentally formed in the same structure, are independently energized or de-energized with the electronic control unit 80. This allows the hydraulic actuators AC1, AC2, AB1, AB2, AB3 to independently and controllably regulate hydraulic pressures, thereby controlling the clutch engaging pressures PC1, PC2, PB1, PB2, PB3. With the automatic transmission portion 20, predetermined engaging devices are coupled in a pattern indicated on, for instance, the coupling-operation indicating table shown in FIG. 2, thereby establishing various gear positions. In addition, during the shifting control of the automatic transmission portion 20, a so-called clutch-to-clutch shifting is executed to simultaneously control the coupling or uncoupling of the clutches C and the brakes B relevant to the shifting operations.

Figure 6:
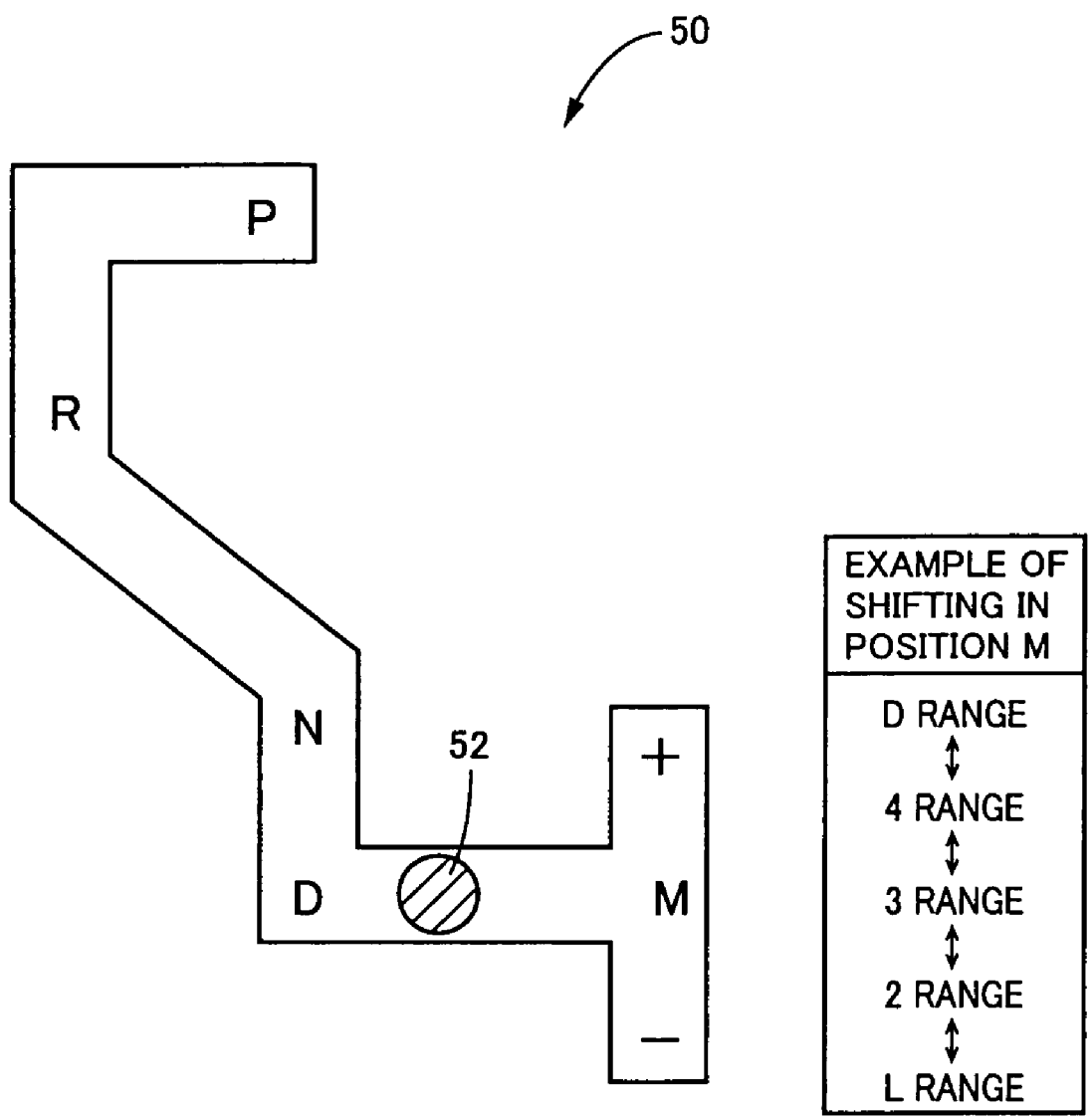
FIG. 6 is a view showing one example of a manually operated shifting device including a shift lever and operable to select one of a plurality of shift positions of multiple kinds.

FIG. 6 is a view showing one example of a manually operated shifting device 50 serving as a changeover device operative to shift multiple kinds of shift positions $P_{SH}$ on manual operation. The shifting device 50 is mounted in, for instance, an area lateral to a driver's seat and includes a shift lever 52 to be manipulated for selecting one of the plurality of shift positions $P_{SH}$.

The shift lever 52 has a parking position "P" (Parking) under which an inside of the transmission mechanism 10, i.e., the power transmitting path inside the automatic transmission portion 20 is shut off in a neutral condition, i.e., a neutral state with the output shaft 22 of the automatic transmission portion 20 remained in a locked state; a reverse drive position "R" (Reverse) for a reverse drive mode; a neutral position "N" (Neutral) for the power transmitting path of the transmission mechanism 10 to be shut off in the neutral state; an automatic forward-drive running position "D" (Drive); and a manual-shift forward-drive position "M" (Manual).

In the automatic forward-drive running position "D", an automatic shift mode is established for executing an automatic shift control within a varying range of a shiftable total speed ratio γT of the transmission mechanism 10 resulting from various gear positions whose automatic shift control is performed in a continuously variable speed ratio width of the differential portion 11 and a range of the 1st-speed to the 4th-speed gear positions of the automatic transmission portion 20. The manual-shift forward-drive position "M" is manually shifted to establish a manual-shift forward-drive mode (manual mode) for setting a so-called shift range to limit a shifting gear position on a high speed range during the operation of the automatic transmission portion 20 under the automatic shift control.

As the shift lever 52 is shifted to the various shift positions $P_{SH}$, the hydraulic control circuit 70 is electrically switched, thereby obtaining the reverse-drive "R" gear position, the neutral position "N" and the various gear shift positions or the like in the forward-drive gear position "D".

Among the various shift positions $P_{SH}$ represented in the "P" to "M" positions, the "P" and "N" positions represent non-running positions selected when no vehicle is caused to run. That is, the "P" and "N" positions represent non-drive positions selected when the first and second clutches C1, C2 select to cause the power transmitting path to be switched to a power cut-off state like a situation where as indicated in, for instance, the coupling operation indicating table shown in FIG. 2, both the first and second clutches C1, C2 are uncoupled to interrupt the power transmitting path inside the automatic transmission portion 20 so as to disenable the driving of the vehicle.

The "R", "D" and "M" positions represent running positions selected when the vehicle is caused to run. That is, these positions represent drive positions selected when the first and/or second clutches C1, C2 select to cause the power transmitting path to be switched to a power transmitting state like a situation where as indicated in, for instance, the coupling operation indicating table shown in FIG. 2, at least one of the first and second clutches C1, C2 is coupled to establish the power transmitting path inside the automatic transmission portion 20 so as to enable the vehicle to be driven.

More particularly, as the shift lever 52 is manually shifted from the "P" position or the "N" position to the "R" position, the second clutch C2 is coupled to cause the power transmitting path of the automatic transmission portion 20 to be switched from the power cut-off state to the power transmitting state. With the shift lever 52 manually shifted from the "N" position to the "D" position, at least the first clutch C1 is coupled to switch the power transmitting path of the automatic transmission portion 20 from the power cut-off state to the power transmitting state.

Further, as the shift lever 52 is manually shifted from the "R" position to the "P" or "N" position, the second clutch C2 is uncoupled to switch the power transmitting path of the automatic transmission portion 20 from the power transmitting state to the power cut-off state. With the shift lever 52 manually shifted from the "D" position to the "N" position, the first clutch C1 or second clutch C2 is uncoupled to switch the power transmitting path of the automatic transmission portion 20 from the power transmitting state to the power cut-off state.

Figure 7:
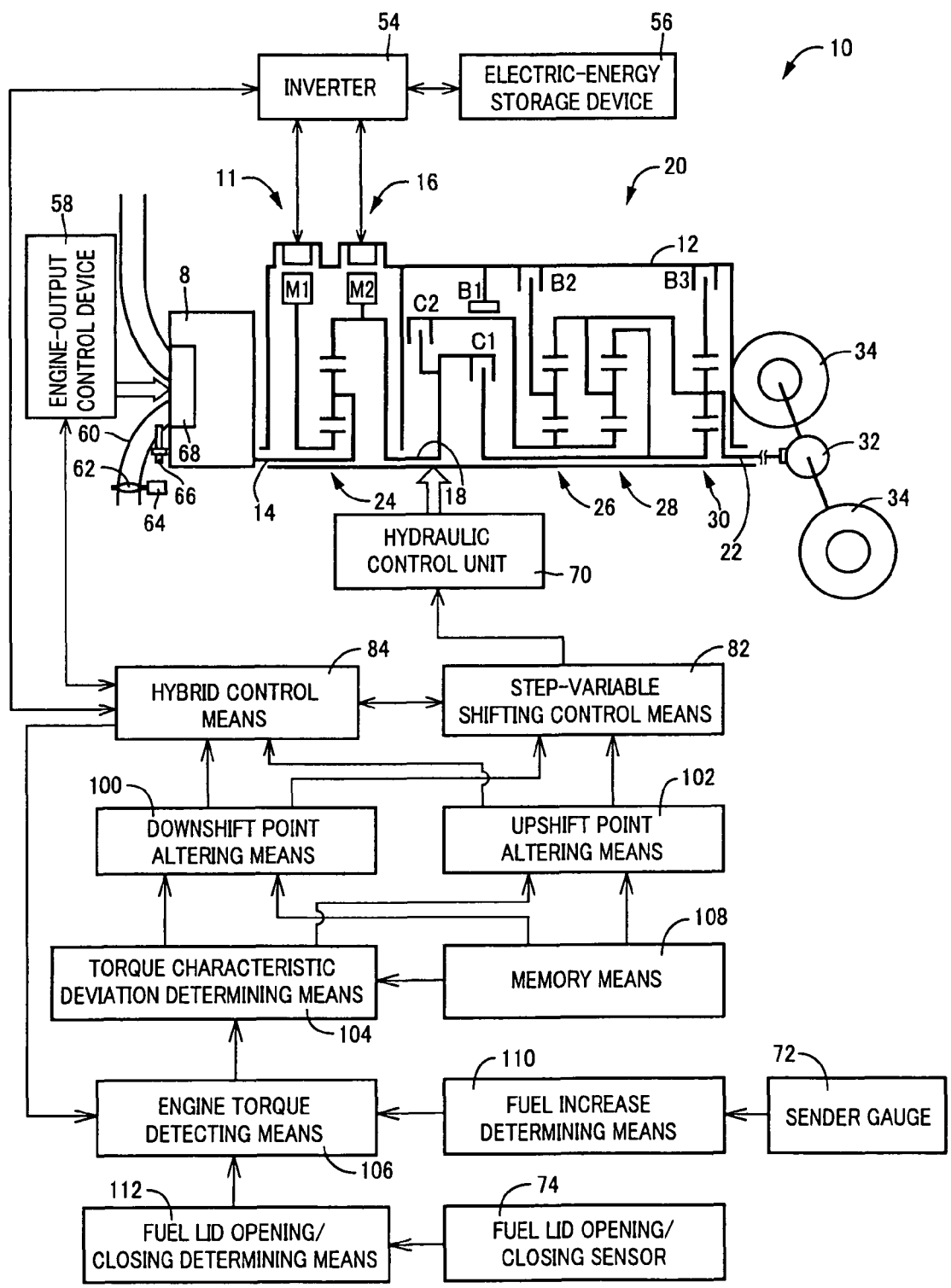
FIG. 7 is a functional block diagram illustrating major control functions of the electronic control unit of FIG. 4.

FIG. 7 is a functional block diagram illustrating major control functions to be executed by the electronic control unit 80. The control unit 80 includes the step-variable shifting control means 82, hybrid control means 84, downshift point altering means 100, upshift point altering means 102, torque characteristic deviation determining means 104, the engine torque detecting means 106, memory means 108, fuel increase determining means 110, and fuel lid opening/closing determining means 112.

Here, the step-variable shifting control means 82 determines a shift demand to the automatic transmission portion 20 based on the output shaft rotational-speed relevant value and a driver's request to cause the automatic transmission portion to execute the automatic shift control so as to obtain a demanded shift position in response to the shift demand. For instance, the step-variable shifting control means 82 determines whether to execute the shifting of the automatic transmission portion 20, i.e., the gear position to be shifted for causing the automatic transmission portion to execute the automatic shift control, based on the vehicle condition, represented by an actual vehicle speed V and the accelerator opening Acc by referring to the relationships (shifting lines and shifting map) involving upshift lines (in solid lines) and downshift lines (in single dot lines) that are preliminarily stored as parameters of the vehicle speed V and the accelerator opening Acc represented in FIG. 8.

Then, the step-variable shifting control means 82 outputs commands (a shift output command and a hydraulic pressure command) to the hydraulic control circuit 70 for coupling i.e. engaging and/or uncoupling i.e. disengaging the hydraulically operated frictional engaging devices, involved in the shifting of the automatic transmission portion 20 so as to establish the gear position in accordance with the coupling table shown in FIG. 2. That is, the step-variable shifting control means 82 outputs a command to the hydraulic control circuit 70 for uncoupling the on-uncoupling side engaging device, involved in the shifting, while coupling the on-coupling side engaging device to cause the clutch-to-clutch shifting to be executed.

Upon receipt of such commands, the hydraulic control circuit 70 causes the linear solenoid valves SL of the automatic transmission portion 20 to be actuated. This allows the hydraulically operated actuators of the hydraulically operated frictional engaging devices, involved in the relevant shifting, to be actuated. Thus, for instance, the on-uncoupling side engaging device is uncoupled and the on-coupling side engaging device is coupled, causing the automatic transmission portion 20 to execute the shifting.

Hybrid control means 84 operates the engine 8 in an optimum operating range at a high efficiency while distributing the drive forces of the engine 8 and the second electric motor M2 at optimum rates and optimally varying a reacting force of the first electric motor M1 during the operation thereof to generate electric power, thereby controllably operating the differential portion 11 under an electrically controlled continuously variable transmission to control a speed ratio $\gamma 0$. At a vehicle speed V during the running of the vehicle in one occasion, for instance, a target (demanded) output for the vehicle is calculated based on the accelerator opening Acc and the vehicle speed V both of which represent output demanded variables of the driver, after which a demanded total target output is calculated based on the target output of the vehicle and a battery charge demanded value.

Subsequently, a target engine output is calculated in consideration of a loss in power transmission, loads of auxiliary units, assist torque of the second electric motor M2 or the like so as to obtain the total target output. Then, the hybrid control means 84 controls the engine 8, while controlling a rate of electric power being generated by the first electric motor M1, so as to obtain the engine speed $N_E$ and engine torque $T_E$ such that the target engine output is obtained.

The hybrid control means 84 executes such controls in consideration of, for instance, the gear position of the automatic transmission portion 20 with a view to increasing a dynamic performance and improving fuel consumption. During such hybrid controls, the differential portion 11 is caused to operate as the electrically controlled continuously variable transmission such that the engine speed $N_E$ and the vehicle speed V, determined for the engine 8 to operate in the operating range at a high efficiency, match the vehicle speed and the rotational speed of the power transmitting member 18 determined with the gear position in the automatic transmission portion 20.

Figure 9:
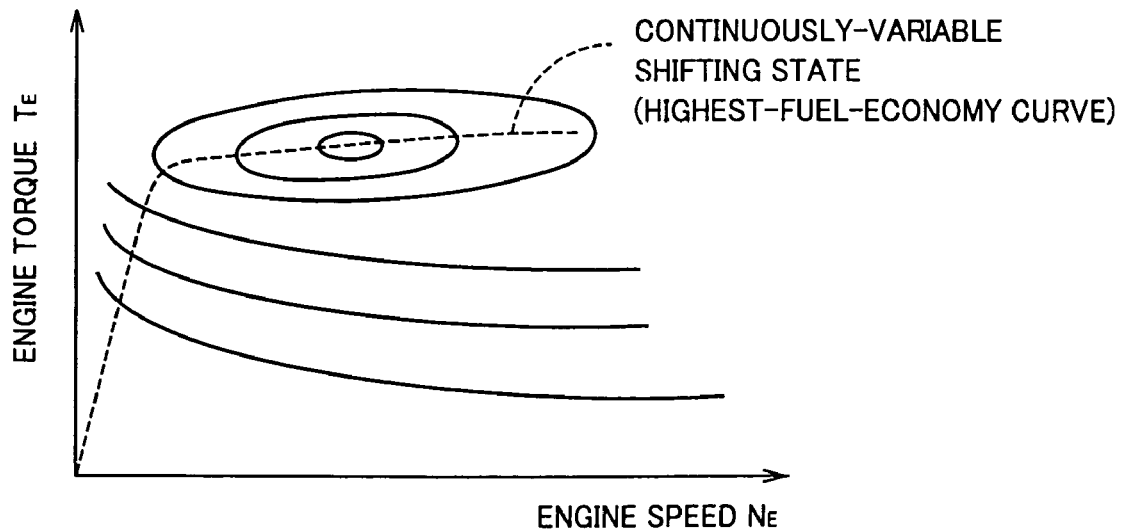
FIG. 9 is a view illustrating one example showing a fuel consumption map with a broken line representing an optimum fuel consumption curve of an engine.

That is, the hybrid control means 84 determines a target value of the total speed ratio $\gamma T$ of the transmission mechanism 10 such that the engine 8 is caused to operate along an optimal fuel efficiency curve (a fuel efficiency map and the relationships) of the engine 8 as indicated by a dotted line in FIG. 9 which is preliminarily and experimentally obtained and prestored. This achieves a compromise between driveability and fuel consumption during the running of the vehicle under a continuously variable shifting mode on a two-dimensional coordinate established with the engine speed $N_E$ and the output torque (engine torque) $T_E$ of the engine 8.

For instance, the target value of the total speed ratio $\gamma T$ of the transmission mechanism 10 is determined so as to obtain the engine torque $T_E$ and the engine speed $N_E$ for generating the engine output demanded for satisfying target outputs (a total target output and demanded drive torque). Then, the speed ratio $\gamma 0$ of the differential portion 11 is controlled in consideration of the gear position in the automatic transmission portion 20 so as to obtain the relevant target value, thereby controlling the total speed ratio $\gamma T$ within a continuously variable shifting range.

Then, the hybrid control means 84 allows electric energy, generated by the first electric motor M1, to be supplied through an inverter 54 to a battery device 56 and the second electric motor M2. Thus, a major part of drive power of the engine 8 is mechanically transferred to the power transmitting member 18. However, a part of drive power of the engine 8 is consumed with the first electric motor M1 for the generation of electric power and converted into electric energy. Resulting electric energy is supplied through the inverter 54 into the second electric motor M2, which is consequently driven. Therefore, the part of drive power is transferred through the second electric motor M2 to the power transmitting member 18. Equipments, involved in the operations from generation of electric energy to consumption thereof at the second electric motor, establish an electric path in which the part of the drive power of the engine 8 is converted into electric energy and resultant electric energy is converted into mechanical energy.

The hybrid control means 84 allows the differential portion 11 to perform an electrically controlled CVT function for controlling, for instance, a first-electric-motor rotational speed $N_{M1}$ and/or a second-electric-motor rotational speed $N_{M2}$ to maintain the engine speed $N_E$ at a nearly constant level or to control the rotational speed at an arbitrary level regardless of the vehicle remaining under a halted condition or a running condition. In other words, the hybrid control means 84 controls the first-electric-motor rotational speed $N_{M1}$ and/or a second-electric-motor rotational speed $N_{M2}$ at an arbitrary level while maintaining the engine speed $N_E$ at the nearly constant level or the arbitrary rotational speed.

As will be apparent from the collinear chart shown in FIG. 3, for instance, when raising the engine speed $N_E$ during the running of the vehicle, the hybrid control means 84 raises the first-electric-motor rotational speed $N_{M1}$ while maintaining a second-electric-motor rotational speed $N_{M2}$ at a nearly fixed level that is bound with the vehicle speed V (represented by the drive wheels 34). In addition, when maintaining the engine speed $N_E$ at the nearly fixed level during the shifting of the automatic transmission portion 20, the hybrid control means 84 varies the first-electric-motor rotational speed $N_{M1}$ in a direction opposite to that in which the second-electric-motor rotational speed $N_{M2}$ varies with the shifting of the automatic transmission portion 20 while maintaining the engine speed $N_E$ at the nearly fixed level.

The hybrid control means 84 causes the throttle actuator 64 to controllably open or close the electronic throttle valve 62 for performing a throttle control. In addition, the hybrid control means 84 functionally includes engine output control means that outputs commands to an engine output control device 58 singly or in combination. This causes a fuel injection device 66 to control a fuel injection quantity and a fuel injection timing for fuel injection control while causing an ignition device 68 to control an ignition timing of an ignition device 68 such as an igniter or the like for an ignition timing control. Upon receipt of such commands, the engine output control device 58 executes an output control of the engine 8 so as to provide a demanded engine output.

For instance, the hybrid control means 84 basically drives the throttle actuator 60 in response to the accelerator opening Acc by referring to the prestored relationship (not shown). The throttle control is executed such that the greater the accelerator opening Acc, the larger will be the throttle valve opening $\theta_{TH}$. Upon receipt of the commands from the hybrid control means 84, further, the engine output control device 58 allows the throttle actuator 64 to controllably open or close the electronic throttle valve 62 for throttle control while controlling the ignition timing of the ignition device 68 such as the igniter or the like for ignition timing control, thereby executing an engine torque control.

Further, the hybrid control means 84 is operative to cause the differential portion 11 to perform the electrically controlled CVT function (differential action) to achieve the motor drive mode regardless of the engine 8 remaining under the halted condition or an idling state.

For instance, the hybrid control means 84 controls the first-electric-motor rotational speed $N_{M1}$ in a negative rotational speed to render, for instance, the first electric motor operative under an unloaded condition, thereby achieving an idling state. Thus, the engine speed $N_E$ is zeroed or nearly zeroed depending on needs due to the electrically controlled CVT function (differential action) of the differential portion 11.

Even if the engine-drive running region is present, the hybrid control means 84 allows the first electric motor M1 and/or the battery device 56 to supply electric energy to the second electric motor M2 using the electrical path mentioned above. This drives the second electric motor M2 to apply the torque to the drive wheels 34, making it possible to provide a so-called torque-assist for assisting drive power of the engine 8.

The hybrid control means 84 renders the first electric motor M1 operative under the unloaded condition to freely rotate in the idling state. This causes the differential portion 11 to interrupt a torque transfer, that is, the differential portion 11 is rendered inoperative with no output being provided under the same state as that in which the power transmitting path is disconnected in the differential portion 11. That is, the hybrid control means 84 places the first electric motor M1 in the unloaded condition, placing the differential portion 11 in a neutral condition (neutral state) in which the power transmitting path is electrically disconnected.

The hybrid control means 84 has a function to serve as regeneration control means to be executed during a coast running with an accelerator pedal being released or during a braking condition with a foot brake being depressed. During such conditions, a kinetic energy of a vehicle, i.e., a reverse drive force is transferred from the drive wheels 38 to the engine 8 to be utilized for improving fuel consumption. To this end, the reverse drive force drivably rotates the second electric motor M2 as an electric power generator to generate electric energy. This electric energy, i.e., a second-motor-generated electric current is applied through an inverter 54 to a battery 56 for charging the same. Such a regeneration control is performed so as to achieve a regeneration rate determined based on a brake-force distribution rate of a braking force provided by a hydraulic brake, depending on a state of charge (SOC) of the battery 56 and a depressing stroke of the brake pedal.

Here, the engine 8 is supplied with fuel composed of predetermined fuel such as gasoline or light oil determined to be optimum for each engine 8. This allows the engine 8 to generate the engine torque $T_E$ with a minimal variation on the same shift point. Thus, the shifting mechanism 10 performs the shifting control with a lessened adverse affect arising from the variation in engine torque $T_E$.

In recent years, meanwhile, an increasing probability occurs on the engine 8 to use a mixed fuel including ethanol, that is the fuel other than the predetermined fuel. The use of mixed fuel is probable to cause a further increased variation in the torque than that of the engine torque $T_E$ arising from fuel such as gasoline or the like used conventionally. Upon using the mixed fuel for instance, the engine 8 generates the increased engine torque $T_E$. Then, the rotary elements, such as the second electric motor M2 and the automatic shifting portion 20 of the differential mechanism 11, fall in high-speed rotation states during a transition in shifting performed in the shifting mechanism 10. Hereunder, description will be made of a control operation forming a major part of the present invention to suppress the occurrence of such high-speed rotation states.

If the engine 8 using the mixed fuel for example generates greater engine torque $T_E$ than reference engine torque $T_{ES}$ arising from use of the predetermined fuel, then, downshift point altering means 100 executes a downshift at a lower accelerator-opening Acc than that at which the downshift is effectuated arising from use of the predetermined fuel. More particularly, if the engine torque $T_E$ becomes greater than that appearing in normal operation, the downshift point altering means 100 alters the shifting diagram shown in FIG. 8, for altering the shift point.

Figure 8:
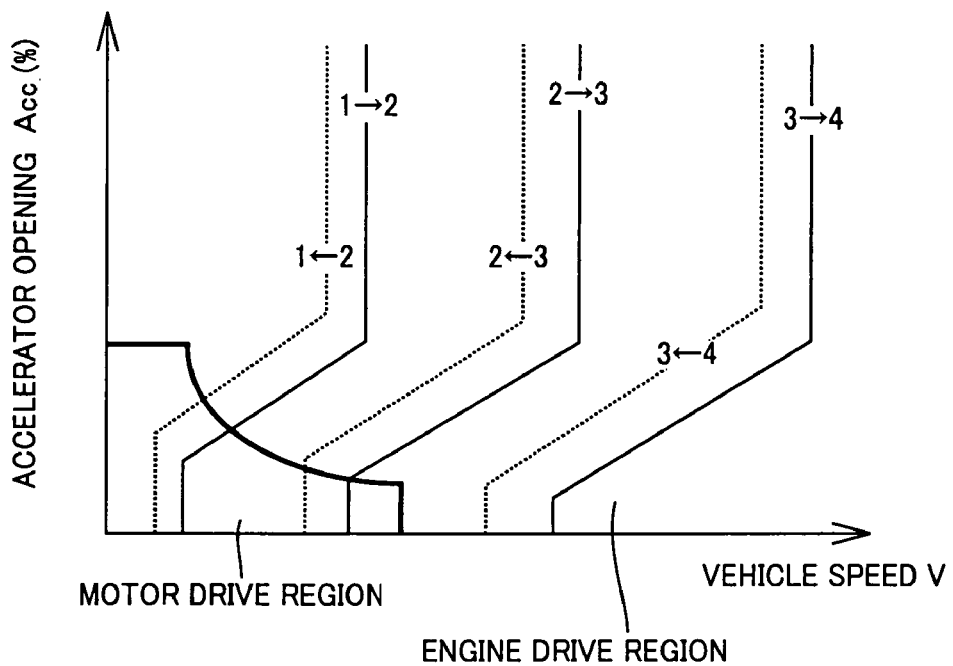
FIG. 8 is a view illustrating one example of a shifting map for use in performing a shifting control of the drive system and one example of drive-power-source map defining boundary lines for use in a drive-power-source switching control between an engine-drive mode and a motor-drive mode with those maps being related to each other.
Figure 10:
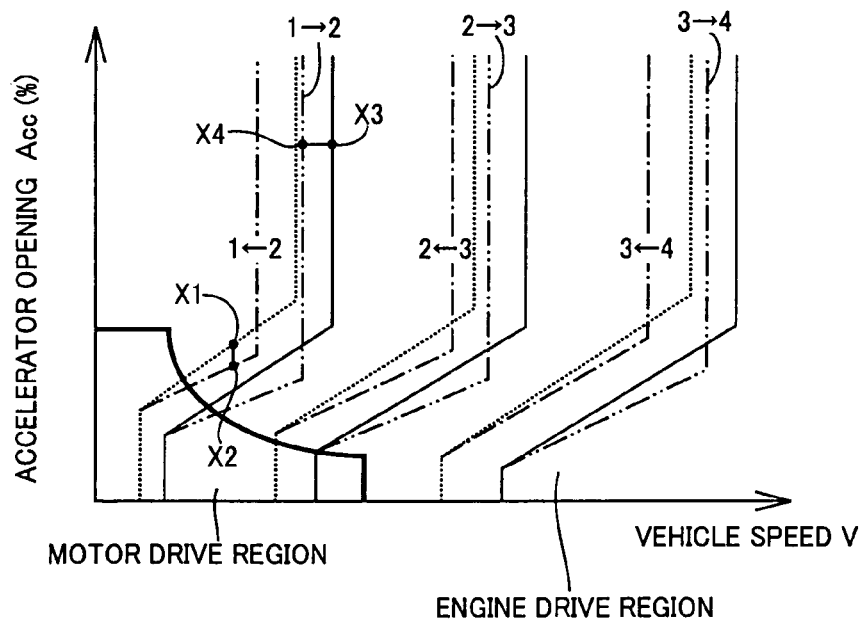
FIG. 10 is a view, showing one example of a shifting diagram with shift lines being altered with respect to conventional shift lines, which corresponds to that of FIG. 8.

FIG. 10 shows one example of a shifting diagram with shift points being altered considering usage of the mixed fuel with respect to the conventional shifting diagram shown in FIG. 8. Further, FIG. 10 shows predetermined shift lines that are altered depending on a discrepancy between reference engine torque $T_{ES}$ arising from fuel used conventionally and the engine torque $T_E$ arising from mixed fuel and greater than it. Here, double dot lines represent upshift lines with shift points being altered, and single dot lines represent downshift lines with shift points being altered. In addition, solid lines and broken lines represent upshift lines and downshift lines used conventionally, respectively.

As shown in FIG. 10, the downshift lines (downshift points) of the embodiment using mixed fuel indicated by the single dot lines have shift points deviated to the lower accelerator-opening Acc than that at which the shift points on the conventional downshift lines (downshift points), shown by the broken lines, are positioned. In a downshift from, for instance, a 2nd-speed gear position to a 1st-speed gear position, the downshift point is altered from a point X1 used conventionally, to the other point X2 placed at a lowered accelerator-opening Acc. That is, the downshift is initiated from the 2nd-speed gear position to the 1st-speed gear position at the shift point X2 placed in the lower accel-opening Acc than that in which the downshift is initiated at the shift point X1 conventionally.

As shown in FIG. 10, further, the other downshift points are similarly executed from a 3rd-speed gear position to the 2nd-speed gear position and from a 4th-speed gear position to the 3rd-speed gear position at the lowered accelerator-opening Acc. This precludes the rotary elements of both the differential portion 11 and the automatic shifting portion 20 from reaching high-speed rotations due to the increase in the engine torque $T_E$.

If the engine torque $T_E$ generated by the engine 8 with using the mixed fuel i.e. the fuel other than the predetermined fuel, becomes greater than reference engine torque $T_{ES}$ arising from use of the predetermined fuel, upshift point altering means 102 executes an upshift at a lower vehicle speed than that at which the upshift is effectuated with using predetermined fuel. More particularly, if the engine torque $T_E$ is greater than that obtained in normal operation, the upshift point altering means 102 alters the shifting diagram shown in FIG. 8 for altering the shift point. As shown by the shifting diagram shown in FIG. 10, upshift lines have shift points deviated to positions in the low vehicle speed on the relatively high accelerator-opening Acc.

During an upshift from for instance the 1st-speed gear position to the 2nd-speed gear position, the upshift point is altered from X3 conventionally used to X4 in the embodiment. That is, the upshift is executed from the 1st-speed gear position to the 2nd-speed gear position at the shift point X4, deviated from the conventional shift point X3, on the lower vehicle speed than that on which the upshift is executed at the shift point X3.

Further, as shown in FIG. 10, the upshift points are similarly altered to shift points for initiating the upshift from the 2nd-speed gear position to the 3rd-speed gear position and from the 3rd-speed gear position to the 4th-speed gear position at the lowered vehicle speed. This allows the upshift to be executed at the lowered vehicle speed, thereby avoiding both the differential portion 11 and the automatic shifting portion 20 from reaching the high-speed rotations.

Figure 11:
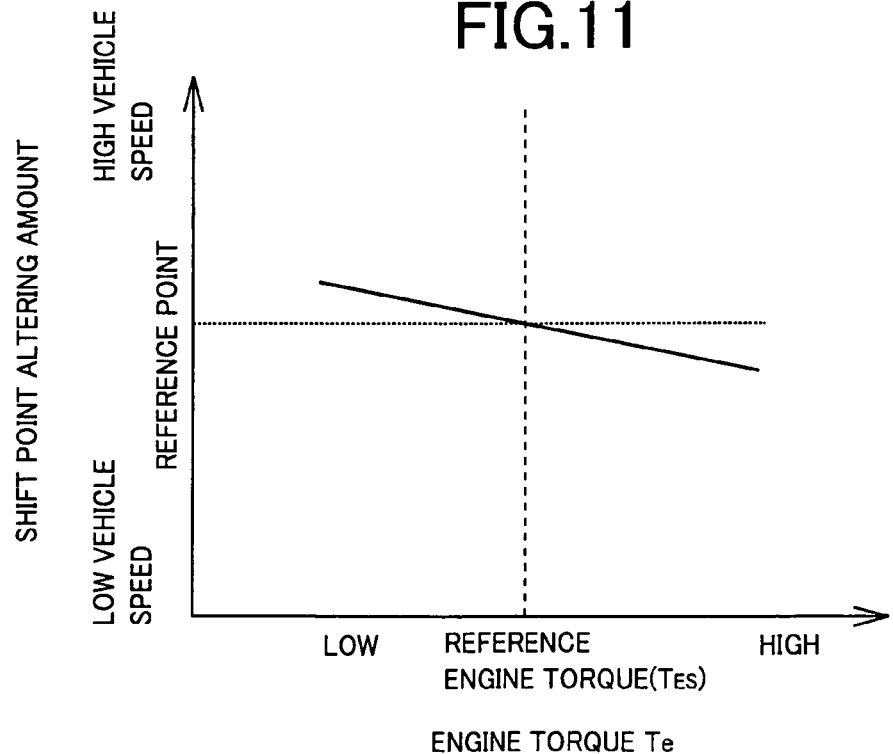
FIG. 11 is a view showing the relationship between a deviation in the torque relative to reference the engine torque generated by the engine in using preliminarily specified fuel, and the amount of altered vehicle speed on a shift point.

FIG. 11 shows the relationship between the rate of torque deviated from reference engine torque $T_{ES}$ generated by the engine 8 with use of the fuel that is preliminarily specified, and the amount of vehicle speed being altered. As shown in FIG. 11, as the engine torque $T_E$ increases with respect to reference engine torque $T_{ES}$ (reference point), the shift point is further altered to a position or side on the low vehicle speed. Thus, as the engine torque $T_E$ becomes greater than the reference engine torque $T_{ES}$, the shift lines shown in FIG. 10 are further shifted to the positions on the low vehicle speed.

In other words, when the engine torque $T_E$ is greater than the reference engine torque $T_{ES}$, under presence of a big difference between the both torques, then, the downshift is initiated at the lower vehicle speed than that at which the upshift is initiated under presence of a little difference between them.

These shift lines are theoretically obtained on preliminary experimental tests. Thus, the shift lines are altered to optimum shift lines depending on the rate of engine torque $T_E$ deviated from the reference engine torque $T_{ES}$, thereby precluding both the differential portion 11 and the automatic shifting portion 20 from reaching the high-speed rotations. In addition, the shift lines may be preliminarily set to shift lines with plural patterns determined in terms of, for instance, a threshold value based on the rate of deviation in torque. The shift lines may be altered depending on functions of the shift lines sequentially calculated depending on the rate of torque being deviated.

As shown in FIG. 11, as the engine torque $T_E$ becomes smaller than reference engine torque $T_{ES}$, the shift points may be further altered to a shift point on a higher vehicle speed. Thus, as the engine torque $T_E$ becomes smaller than the reference engine torque $T_{ES}$, the shift lines shown in FIG. 10 are deviated to positions or sides on the higher vehicle speed. In other words, when the engine torque $T_E$ is less than the reference engine torque $T_{ES}$, under presence of the big difference between the both torques, then, the downshift is initiated at the shift point on the higher vehicle speed than that on which the downshift is initiated under presence of the little difference between them.

Thus, even if the engine torque $T_E$ decreases, the shift points are altered to the positions placed on the higher vehicle speed, no drop occurs in power performance. However, when altering the shift point to the position on the higher vehicle speed, the amount of shift point deviated to a region on the higher vehicle speed is determined to lay at a value below which none of the differential portion 11 and the automatic shifting portion 20 reaches the high-speed rotation.

A similar tendency occurs in effect even if the vehicle speed V, based on which the amount of alteration in shift point is plotted on a vertical line in FIG. 10, is replaced by the accelerator-opening Acc. That is, as the engine torque $T_E$ becomes greater than reference engine torque $T_{ES}$ in an increasing degree, the shift points are altered to regions on the lower accelerator-opening Acc. In other words, when the engine torque $T_E$ becomes greater than the reference engine torque $T_{ES}$, under presence of the big difference between the both torques, then, the downshift is initiated at the shift point on the lower accelerator-opening Acc than that on which the downshift is initiated under presence of the little difference between them. Moreover, as the engine torque $T_E$ becomes less than reference engine torque $T_{ES}$, the shift points are further altered to the positions or sides on the higher accelerator-opening Acc.

Stated another way, when the engine torque $T_E$ is less than reference engine torque $T_{ES}$, under presence of the big difference between the both torques, then, the downshift is initiated at the shift point on the higher accelerator-opening Acc than that on which the downshift is initiated under presence of the little difference between them. Moreover, the shift lines are altered to optimum shift lines depending on the rate of engine torque $T_E$ deviated from reference engine torque $T_{ES}$ such that none of the differential portion 11 and the automatic shifting portion 20 reaches the high-speed rotation.

Torque characteristic deviation determining means 104 calculates the amount of deviation in the engine torque $T_E$ detected by the engine torque detecting means 106 relative to reference engine torque $T_{ES}$. This allows the determination to be made whether or not the amount of such deviation exceeds a given amount of deviation preliminarily stored in memory means 108. If the amount of relevant deviation exceeds the given amount of deviation, then, both the downshift point altering means 100 and the upshift point altering means 102 alter the shift points to optimum levels depending on the deviated amount. In addition, the given amount of deviation is determined to a degree of deviation below which adverse affects on both the differential portion 11 and the automatic shifting portion 20 are lessened during a transition in the gear shifting.

The engine torque detecting means 106 serves to detect the magnitude of current engine torque $T_E$ of the engine 8 detected based on reactive torque of the first electric motor M1. Further, reactive torque of the first electric motor M1 is calculated based on, for instance, the rotation speed $N_{M1}$ of the first electric motor M1 and the amount of electric power generated by the first electric motor M1. In addition, a torque sensor may be mounted on the first electric motor M1 to directly detect reactive torque. Upon detection of reactive torque of the first electric motor M1, the engine torque $T_E$ is calculated based on a calculation formula involved in known technology. The resulting calculated engine torque $T_E$ allows the torque characteristic deviation determining means 104 to be effectuated.

Fuel increase determining means 110 executes the operation based on a fuel level signal, representing fuel in a fuel tank, which is delivered from a sender gauge 72 mounted in the fuel tank, thereby determining whether or not there is an increase in fuel. In the illustrated embodiment, if the fuel increase determining means 110 makes a positive determination, i.e., when the increase in fuel is determined, then, the engine torque detecting means 106 detects the magnitude of the engine torque $T_E$. Here, it is conceived that a variation occurring in the fuel level inside the fuel tank generates a variation in the magnitude of engine torque $T_E$. Therefore, the engine torque detecting means 106 is effectuated only when there is a probability of a fuel increase in the fuel tank, that is, when a fuel level change occurs in the fuel tank. Thus, the engine torque detecting means 106 is not effectuated at all times but effectuated at limited timing upon increase in the fuel, thereby achieving a load reduction on executing a control.

Fuel lid opening/closing determining means 112 executes the operation based on a fuel lid opening/closing signal delivered from a fuel lid opening/closing sensor 74 mounted on a fuel lid, thereby determining whether or not the fuel lid for supplying fuel the vehicle is opened or closed. If the fuel lid opening/closing determining means 112 makes a positive determination, that is, when the determination is made that the fuel lid is opened, then, the engine torque detecting means 106 detects the magnitude of engine torque $T_E$. Here, like the operation executed by the fuel increase determining means 110, it is conceived that a variation may occur in fuel level in the fuel tank, the engine torque detecting means 106 is effectuated only at timing when the fuel lid is opened or closed.

Thus, the engine torque detecting means 106 is not effectuated at all times but executed at limited timing upon occurrence of the fuel level variation in the fuel tank, thereby achieving a load reduction on executing the control. In addition, since both the fuel increase determining means 110 and the fuel lid opening/closing determining means 112 are effectuated on the same purpose to achieve the load reduction on executing the control, either one of them is sufficiently effectuated.

Thus, the engine torque detecting means 106 effectuates operation thereof when both of or one of the fuel increase determining means 110 and the fuel lid opening/closing determining means 112 make the positive determination. The torque characteristic deviation determining means 104 determines that engine torque $T_E$ detected by the engine torque detecting means 106 becomes greater than reference engine torque $T_{ES}$ by a deviated value more than a given value. In this moment, the downshift point altering means 100 and the upshift point altering means 102 effectuates operation thereof.

Figure 12:
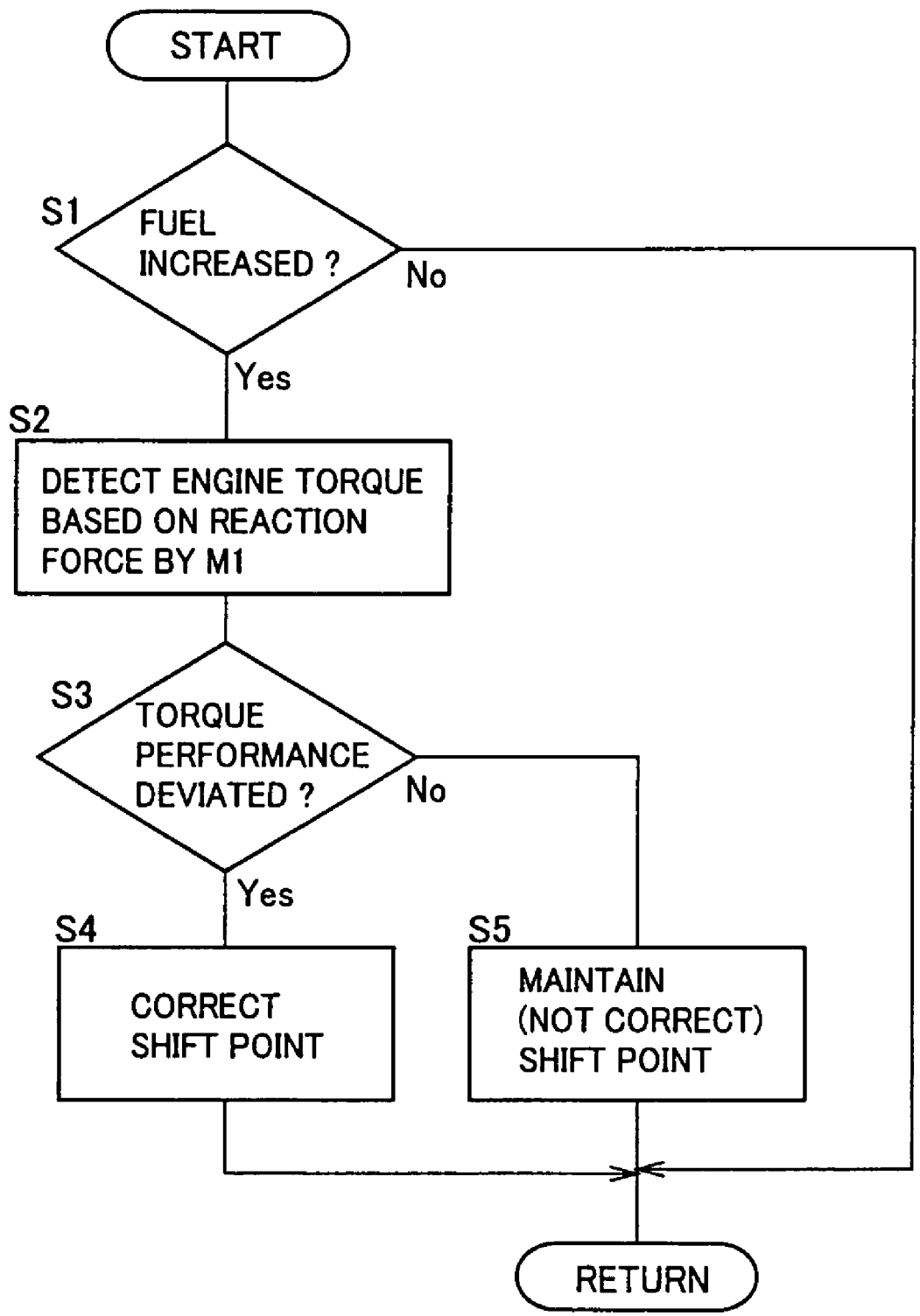
FIG. 12 is a flowchart illustrating a major basic sequence of control operations to be executed by the electronic control device, that is, a basic sequence of control operations for altering the shift point of a shifting mechanism to prevent the shifting mechanism from reaching a high-speed rotation.

FIG. 12 is a flowchart illustrating a major basic sequence of control operations to be executed by the electronic control device 80, that is, a basic sequence of controls operations for suppressing the occurrence of high-speed rotation of the shifting mechanism 10 (including the differential portion 11 and the automatic shifting portion 20) by altering the shift point of the shifting mechanism 10.

First, in S1 corresponding to the fuel increase determining means 110, the determination is made whether or not there is a fuel increase in the fuel tank. If the determination is made negative in S1, then, the current routine is terminated. This reduces the load on executing the control. In S1, further, in place of effectuating the fuel increase determining means 110, the fuel lid opening/closing determining means 112 may be effectuated to obtain the same effect. Further, both the fuel increase determining means 110 and the fuel lid opening/closing determining means 112 may effectuate operations thereof.

If the determination is made positive in S1, then, in S2 corresponding to the engine torque detecting means 106, the engine torque $T_E$ generated at the engine 8 is detected based on the reactive torque of the first electric motor M1. In succeeding S3 corresponding to the torque characteristic deviation determining means 104, the determination is made whether or not the engine torque $T_E$ generated depending on the accelerator-opening Acc is deviated from reference engine torque $T_{ES}$ by a value beyond a given deviation amount.

If the determination is made negative in S3, that is, when the determination is made that the deviated amount in the engine torque $T_E$ lies in a given value, then, the operation is executed in S5 corresponding to both the downshift point altering means 100 and the upshift point altering means 102. In this case, the gear shifting is initiated in accordance with the normal shifting diagram shown in FIG. 8 with no shift point being corrected (altered). Here, the rotary members such as the second electric motor M2 and the automatic shifting portion 20 are designed to tolerate the high-speed rotations thereof to some extent. Therefore, as long as the deviation of the engine torque $T_E$ remains within the given amount, a drop in durability of the shifting mechanism 10 due to the high-speed rotation can be suppressed.

If the determination is made negative in S3, that is, when the determination is made that the deviated amount in the engine torque $T_E$ exceeds the given value, then, the rotary elements such as the differential portion 11, the second electric motor M2 connected to the differential portion 11 and the automatic shifting portion 20 fall in high-speed rotating regions during the gear shifting. Thus, there is a probability even upon performing the known high-speed-rotation preventive control, the number of rotations has no or small margin to be controlled.

To address such an issue, the operation is executed in S4 corresponding to both the downshift point altering means 100 and the upshift point altering means 102 for correcting (altering) the shift point. More particularly, the shift point is altered in accordance with the shifting diagrams shown in FIGS. 10 and 11, upon which, for instance, under increase of the engine torque $T_E$, the upshift lines are shifted to the positions on the low vehicle speed region. This allows the upshift to be executed on an earlier stage.

In this way, the engine rotation speed $N_E$ and the rotation speed input to the automatic shifting portion 20 can be lowered to lowered levels. Thus, even if the blowup of the engine 8 resulted from the increased engine torque $T_E$ increases during the gear shifting, the rotary elements of the shifting mechanism 10 are avoided from falling in the high-speed rotating region. Further, a loss in allowable margin can be avoided in the high-speed-rotation preventive control executed upon occurrence of failure during the execution of the upshift.

With the present embodiment, as set forth above, if the engine torque $T_E$ generated by the engine 8 with using the mixed fuel and being connected to the shifting mechanism 10 in the power transmissive state, becomes greater than reference engine torque $T_{ES}$ with using the predetermined fuel, the downshift is initiated at the lower accelerator-opening than that at which the downshift is effectuated by the predetermined fuel. This allows the gear shifting to be executed at the shift point in which the engine 8 generates the decreased torque. That is, the gear shifting is initiated at the shift point suppressing a torque increase in consideration of the increase in the engine torque $T_E$ generated by the engine 8. Thus, the rotary elements of the shifting mechanism 10 can be precluded from reaching the high-speed rotations during a transition in downshift. This suppresses a drop in durability of the shifting mechanism 10.

With the present embodiment, the upshift point altering means 102 is provided to initiate the upshift at the lower vehicle speed. That is, if the engine torque $T_E$ generated at the engine 8 by use of the mixed fuel for example, becomes greater than reference engine torque $T_{ES}$ by use of the predetermined fuel, then, the upshift is initiated at the lower vehicle speed than that at which the upshift is effectuated by use of the predetermined fuel. This allows the upshift is initiated on an earlier stage. This suppresses the rotation speed of the engine 8 and the input rotation speed of the automatic shifting portion 20 to lowered levels during the transition in upshift, causing the engine 8 to provide increased torque. Thus, even if the blowup of the engine 8 increases during the transition in upshift, the differential portion 11 and the automatic shifting portion 20 can be avoided from reaching the high-speed rotating region. This suppresses a drop in durability of the shifting mechanism 10.

With the present embodiment, the downshift point altering means 100 is provided to initiate the downshift at the lowered accelerator-opening region. That is, when the torque generated by the engine 8 becomes greater than torque generated in using the predetermined fuel, if there is a big difference between relevant torques, then, the downshift is initiated at the lower accelerator-opening than that at which the downshift is effectuated when there is a little difference between such torques. Thus, the gear shifting is executed at the shift point in which the engine 8 generates the decreased torque. That is, the gear shifting is initiated at the shift point in which a torque increase is suppressed in consideration of an increase in engine torque $T_E$ generated by the engine 8. Thus, the rotary elements of the shifting mechanism 10 can be precluded from reaching the high-speed rotations during a transition in downshift. This suppresses a drop in durability of the shifting mechanism 10.

With the present embodiment, the downshift point altering means 100 is provided to initiate the downshift at the high accelerator-opening. When the torque generated by the engine 8 becomes less than the torque generated with using predetermined fuel, if there is a big difference between relevant torques, then, the downshift is initiated at the higher accelerator-opening than that at which the downshift is effectuated when there is a little difference between such torques. Thus, even if the torque generated by the engine 8 decreases, the shift point is pulled up to an increased accelerator-opening, thereby enabling the gear shifting to be initiated at the shift point in which the engine 8 generates same torque as that generated with using the predetermined fuel.

With the present embodiment, the shifting mechanism 10 is comprised of the differential portion 11 and the automatic shifting portion 20, enabling the gear shifting to be initiated at the shift point in which the engine torque of the engine 8 is prevented from increasing. This avoids the rotary elements of the automatic shifting portion 20, and the differential portion 11 and the second electric motor M2 connected to the differential portion 11 from reaching the high-speed rotations, thereby suppressing a drop in durability of the engine.

With the present embodiment, if the engine torque $T_E$ generated by the engine 8 becomes greater than reference engine torque $T_{ES}$ generated with using the predetermined fuel, the upshift is initiated at the lower vehicle speed than that at which the upshift is effectuated when the predetermined fuel is used. This allows the upshift to be initiated on an earlier stage. Thus, the rotation speed of the engine 8 and the input rotation speed of the automatic shifting portion 20 are decreased to lowered levels during a transition in upshift. Therefore, even if the engine torque $T_E$ of the engine 8 increases and the blowup of the engine 8 increases during the transition in upshift, the differential portion 11 and the automatic shifting portion 20 are avoided from reaching the high-speed rotations. This suppresses a drop in durability of the shifting mechanism 10.

With the present embodiment, the downshift point altering means 100 is provided to initiate the downshift at the lowered vehicle speed region. When the torque generated by the engine 8 becomes greater than torque generated in using predetermined fuel, if there is a big difference between relevant torques, then, the downshift is initiated at the lower vehicle speed than that at which the downshift is effectuated when there is a little difference between such torques. This restricts the rotation speeds of the engine 8 and the shifting mechanism 10 during a transition in downshift. Thus, even if the engine torque $T_E$ of the engine 8 increases and the blowup of the engine 8 increases during the transition in upshift, the rotary elements of the shifting mechanism 10 can be avoided from reaching the high-speed rotating regions. This suppresses a drop in durability of the shifting mechanism 10.

With the present embodiment, the downshift point altering means 100 is provided to initiate the downshift at the high vehicle speed region. When the torque generated by the engine 8 becomes greater than torque generated with using the predetermined fuel, if there is a big difference between relevant torques, then, the downshift is initiated at the higher vehicle speed than that at which the downshift is effectuated when there is a little difference between such torques. Therefore, even if the engine torque $T_E$ generated by the engine 8 decreases during a transition in downshift, altering the shift point to the high vehicle speed region prevents a reduction in rotation speeds of both the engine 8 and the shifting mechanism 10 due to a drop in torque. That is, a drop in power performance can be suppressed.

With the present embodiment, the engine torque $T_E$ generated by the engine 8 can be detected based on reactive torque of the first electric motor M1. Therefore, the engine torque $T_E$ of the engine 8 can be detected with no additional use of other component part such as a torque sensor or the like.

With the present embodiment, the detection engine torque $T_E$ of the engine 8 is performed when the fuel supplied to the engine 8 increases, or when the fuel lid is opened. Thus, none of the downshift point altering means 100 and the upshift point altering means 102 effectuates operation thereof while detecting torque of the engine 8 at all times. This results in load reduction on executing the control.

<Other Embodiment and Modification>

While the present invention has been described above with reference to the embodiment shown in the drawings, the present invention may be applied in other modes.

In the illustrated embodiment, for instance, the engine torque detecting means is of the type that detects engine torque $T_E$ based on reactive torque of the first electric motor M1. However, for instance, the engine torque $T_E$ can be directly detected by a torque sensor mounted on the first electric motor M1.

With the present embodiment, regarding correction (alteration) of the shift point, no need necessarily arises for correcting the shift point when the engine torque $T_E$ is lower than reference engine torque $T_{ES}$.

In the illustrated embodiment, although the second electric motor M2 is directly connected to the transmitting member 18, connecting position thereof is not limited to this fashion. That is, the second electric motor M2 can be directly or indirectly connected to the power transmitting path extended from the differential portion 11 to the drive wheel 34.

In the illustrated embodiment, while the differential portion 11 is configured to function as the electrically controlled continuously variable transmission in which the speed ratio $\gamma 0$ is continuously varied from the minimal value $\gamma 0_{min}$ to the maximal value $\gamma 0_{max}$, the present invention may be applied even to a case wherein the speed ratio $\gamma 0$ of the differential portion 11 is not continuously varied but pretended to vary step-by-step with the use of a differential action.

In the illustrated embodiment set forth above, moreover, the differential portion 11 may be of the type that includes a differential action limiting device incorporated in the power distributing mechanism 16 for limiting a differential action to be operative as at least a forward 2nd-stage step-variable transmission.

With the power distribution mechanisms 16 of the illustrated embodiments, the first carrier CA1 is connected to the engine 8; the first sun gear S1 is connected to the first electric motor M1; and the first ring gear R1 is connected to the power transmitting member 18. However, the present invention is not necessarily limited to such connecting arrangement, and the engine 8, first electric motor M1 and power transmitting member 18 have no objection to be connected to either one of the three elements CA1, S1 and R1 of the first planetary gear set 24.

Although the illustrated embodiment has been described with reference to the engine 8 directly connected to the input shaft 14, these component parts may suffice to be operatively connected via, for instance, gears, belts or the like. No need may arise for the engine 8 and the input shaft 14 to be necessarily disposed on a common axis.

Further, while the illustrated embodiment has been described with reference to the first electric motor M1 and the second electric motor M2 wherein the first electric motor M1 is coaxially disposed with the drive apparatus input shaft 14 and connected to the first sun gear S1 upon which the second electric motor M2 is connected to the power transmitting member 18. However, no need arises for these component parts to be necessarily placed in such connecting arrangement. For example, the first electric motor M1 may be connected to the first sun gear S1 through gears, a belt or the like, and the second electric motor M2 may be connected to the power transmitting member 18.

In the illustrated embodiment, further, the hydraulically operated frictional engaging devices such as the first and second clutches C1, C2 may include magnetic type clutches such as powder (magnetic powder) clutches, electromagnetic clutches and meshing type dog clutches, and electromagnetic type and mechanical engaging devices. For instance, with the electromagnetic clutches being employed, the hydraulic control circuit 70 may not include a valve device for switching hydraulic passages and may be replaced with a switching device or electromagnetically operated switching device or the like that are operative to switch electrical command signal circuits for electromagnetic clutches.

While the illustrated embodiment has been described above with reference to the automatic transmission portion 20 that is connected to the differential portion 11 in series via the power transmitting member 18, a countershaft may be provided in parallel to the input shaft 14 to allow the automatic transmission portion 20 to be coaxially disposed on an axis of the countershaft. In this case, the differential portion 11 and the automatic transmission portion 20 may be connected to each other in power transmitting capability via a set of transmitting members structured of, for instance, a counter-gear pair acting as the power transmitting member 18, a sprocket and a chain.

With the present embodiment, although the power distributing mechanism 16 is structured of one set of planetary gear sets, the power distributing mechanism 16 may include more than two planetary gear sets with a function to serve as a transmission achieving gear positions with more than three stages in a non-differential state (fixed gear shifting state). Further, these planetary gear sets are not limited to those of the single pinion type but may include those of a double pinion type.

Even in a case where the power distributing mechanism 16 is constructed of more than two planetary gear sets, the power distributing mechanism 16 may take the form of a structure described below. That is, the engine 8, the first and second electric motors M1 and M2 and the power transmitting member 18 are connected to the rotary elements of these planetary gear sets to which the clutch C and the brake B are connected. Controlling the clutch C and the brake B enables the power distributing mechanism 16 to be switched to one of a step-variable shifting mode and an infinitely variable shifting mode.

In the illustrated embodiment, while the engine 8 and the differential portion 11 are directly connected to each other, no need necessarily arises for these component elements to be directly connected to each other and the engine 8, and the differential portion 11 may be connected to each other via a clutch.

In the illustrated embodiment, while the differential portion 11 and the automatic shifting portion 20 are directly connected to each other, the present invention is not particularly limited to such a structure. That is, the present invention is applicable in a structure causing a whole of the shifting mechanism 10 to have a function to perform an electrically controlled differential action while causing a whole of the shifting mechanism 10 to initiate the gear shifting on a principle different from the gear shifting effectuated by the electrically controlled differential action. Thus, no need arises these functions to be performed in mechanically independent fashions.

In addition, the present invention is not limited to such a layout in arrangement and an order in placement of such component parts and these component parts may be placed in a freely designed layout. Moreover, with the shifting mechanism arranged to have a structure with a function to perform an electrically controlled differential action and a function to perform the gear shifting, the present invention can be applied even if such structures partly overlap or even if all of the structures are common to each other.

Needless to say, described above are no more than illustrations of the present invention. The present invention can be modified and carried out along knowledge of the skilled person without departing the gist thereof.

What is claimed is:

1. A control device for a vehicular power transmitting device for automatically performing a gear shifting depending on a driving condition of a vehicle, wherein an internal combustion engine generating a torque is connected to the vehicular power transmitting device in a power transmissive state;

the control device includes downshift point altering means operative, when the torque generated by the internal combustion engine with using a fuel other than a predetermined fuel becomes greater than a torque generated with using the predetermined fuel, to initiate a downshift at a lower accelerator-opening than that at which the downshift is initiated with using the predetermined fuel;

the vehicular power transmitting device includes an electrically controlled differential portion, operative to control a differential state between a rotation speed of an input shaft and a rotation speed of an output shaft upon controlling an operating state of an electric motor connected to a rotary element of a differential mechanism, and a step-variable transmission portion, operative to function as step-variable shifting portion, both the electrically controlled differential portion and the step-variable transmission portion being disposed in a power transmitting path; and the torque generated by the internal combustion engine is detected based on reactive torque of the electric motor.

2. The control device for the vehicular power transmitting device according to claim 1, further comprising upshift point altering means operative, when the torque generated by the internal combustion engine with using a fuel other than a predetermined fuel is greater than the torque generated by the predetermined fuel, to initiate an upshift at a lower vehicle speed than that at which the upshift is initiated with using the predetermined fuel.

3. The control device for the vehicular power transmitting device according to claim 1, wherein the downshift point altering means is operative, as the torque generated by the internal combustion engine with using the fuel other than the predetermined fuel becomes greater than the torque generated with using the predetermined fuel, to initiate the downshift at the lower accelerator-opening.

4. The control device for the vehicular power transmitting device according to claim 1, wherein the downshift point altering means is operative, as the torque generated by the internal combustion engine with using the fuel other than the predetermined fuel becomes less than the torque generated with using the predetermined fuel, to initiate the downshift at the higher accelerator-opening.

5. The control device for the vehicular power transmitting device according to claim 1, wherein the torque generated by the internal combustion engine is detected upon increase of the fuel supplied to the internal combustion engine or opening of a fuel lid.

6. The control device for the vehicular power transmitting device according to claim 1, wherein the step-variable transmission portion is a step-variable automatic transmission.

7. The control device for the vehicular power transmitting device according to claim 1, wherein the step-variable transmission portion is automatically shifted based on a shifting diagram preset.

8. The control device for the vehicular power transmitting device according to claim 1, wherein a total shifting ratio is established based on a shifting ratio of the step-variable transmission portion and a shifting ratio of the electrically controlled differential portion.

9. A control device for a vehicular power transmitting device, wherein
an internal combustion engine generating a torque is connected to the vehicular power transmitting device in a power transmissive state;
the vehicular power transmitting device includes an electrically controlled differential portion operative to control a differential state between a rotation speed of an input shaft and a rotation speed of an output shaft upon controlling an operating state of an electric motor connected to a rotary element of a differential mechanism, and a step-variable transmission portion operative to function as a step-variable shifting portion, the electrically controlled differential portion and the step-variable transmission being disposed in a power transmitting path;
the control device includes upshift point altering means operative, when the torque generated by the internal combustion engine with using a fuel other than a predetermined fuel becomes greater than the torque generated with using the predetermined fuel, to initiate an upshift at a lower vehicle speed than that at which the upshift is initiated with using the predetermined fuel; and
the torque generated by the internal combustion engine is detected based on reactive torque of the electric motor.

10. The control device for the vehicular power transmitting device according to claim 9, wherein the control device further including downshift point altering means is operative, as the torque generated by the internal combustion engine with using a fuel other than a predetermined fuel becomes greater than the torque generated with using the predetermined fuel, to initiate the downshift at the lower vehicle speed.

11. The control device for the vehicular power transmitting device according to claim 9, wherein the downshift point altering means is operative, as the torque generated by the internal combustion engine with using a fuel other than a predetermined fuel becomes less than the torque generated with using the predetermined fuel, to initiate the downshift at a higher vehicle speed.

12. The control device for the vehicular power transmitting device according to claim 9, wherein the torque generated by the internal combustion engine is detected upon increase of the fuel supplied to the internal combustion engine or opening of a fuel lid.

13. The control device for the vehicular power transmitting device according to claim 9, wherein the step-variable transmission portion is a step-variable automatic transmission.

14. The control device for the vehicular power transmitting device according to claim 11, wherein the step-variable transmission portion is automatically shifted based on a shifting diagram preset.

15. The control device for the vehicular power transmitting device according to claim 9, wherein a total shifting ratio is established based on a shifting ratio of the step-variable transmission portion and a shifting ratio of the electrically controlled differential portion.

* * * * *